United States Patent
Kim et al.

(10) Patent No.: US 11,461,910 B2
(45) Date of Patent: Oct. 4, 2022

(54) ELECTRONIC DEVICE FOR BLURRING IMAGE OBTAINED BY COMBINING PLURAL IMAGES BASED ON DEPTH INFORMATION AND METHOD FOR DRIVING THE ELECTRONIC DEVICE

(71) Applicant: Samsung Electronics Co., Ltd., Suwon-si (KR)

(72) Inventors: Pyojae Kim, Suwon-si (KR); Hyeokjae Jeong, Suwon-si (KR); Myungjung Lee, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 16/526,107

(22) Filed: Jul. 30, 2019

(65) Prior Publication Data

US 2020/0051265 A1    Feb. 13, 2020

(30) Foreign Application Priority Data

Aug. 8, 2018   (KR) .......................... 10-2018-0092450

(51) Int. Cl.
*G06T 7/55* (2017.01)
*G02B 7/09* (2021.01)
(Continued)

(52) U.S. Cl.
CPC ............ *G06T 7/55* (2017.01); *G02B 7/09* (2013.01); *G06T 1/20* (2013.01); *G06T 5/004* (2013.01);
(Continued)

(58) Field of Classification Search
CPC .. G06T 7/55; G06T 1/20; G06T 5/004; G06T 2207/20221; G06T 5/003; G06T 5/001;
(Continued)

(56) References Cited

U.S. PATENT DOCUMENTS

2014/0009585 A1    1/2014 Campbell et al.
2016/0234473 A1*   8/2016 Choi ......................... G06T 7/85
(Continued)

FOREIGN PATENT DOCUMENTS

CN    107635093 A    1/2018
CN    107959778 A    4/2018
(Continued)

OTHER PUBLICATIONS

Wadhwa et al.; Synthetic Depth-of-Field with a Single-Camera Mobile Phone; ACM Trans. Graph., vol. 37, No. 4, Article 64; Arxiv.org, Cornell University Library, 201 Olin Library Cornell University Ithaca, NY 14853, Jun. 11, 2018 (Jun. 11, 2018); XP080889498; https://doi.org/10.1145/3197517.3201329.
(Continued)

*Primary Examiner* — Christopher M Brandt
(74) *Attorney, Agent, or Firm* — Jefferson IP Law, LLP

(57) ABSTRACT

An electronic device having a first and second camera deployed on one side of the electronic device, a memory, and at least one processor configured to acquire a plurality of first image frames for external objects using the first camera based on an input corresponding to a photographing signal, acquire a second image frame for the external objects using the second camera while acquiring parts of the first image frames, generate depth information for the external objects based on the image frame corresponding to the second image frame among the plurality of first image frames and the second image frame, generate a first corrected image by combining a plurality of designated image frames among the plurality of first image frames, and generate a second corrected image in which parts of the external objects included in the first corrected image are blurred based on the depth information.

14 Claims, 18 Drawing Sheets

(51) Int. Cl.
  *G06T 1/20* (2006.01)
  *H04N 5/225* (2006.01)
  *G06T 5/00* (2006.01)
  *H04N 13/00* (2018.01)

(52) U.S. Cl.
  CPC . *H04N 5/2258* (2013.01); *G06T 2207/20221* (2013.01); *H04N 2013/0081* (2013.01)

(58) Field of Classification Search
  CPC ............... G02B 7/09; H04N 5/2258; H04N 2013/0081; H04N 5/23258; H04N 5/23267; H04N 5/23287; H04N 5/247; H04N 5/265
  See application file for complete search history.

(56) References Cited

U.S. PATENT DOCUMENTS

2016/0301840 A1  10/2016  Du et al.
2017/0347088 A1  11/2017  Barron et al.
2017/0352136 A1*  12/2017  Uliyar .................... H04N 5/247
2019/0166286 A1  5/2019  Ouyang et al.

FOREIGN PATENT DOCUMENTS

| CN | 108024057 A | 5/2018 |
| EP | 2 683 169 A3 | 4/2017 |
| EP | 3 493 519 A1 | 6/2019 |

OTHER PUBLICATIONS

European search Report dated Apr. 1, 2021; European Appln. No. 19847303.5-1208 / 3776455 PCT/KR2019009578.
Written Opinion of the International Preliminary Examining Authority dated Nov. 25, 2020; International Appln. No. PCT/KR2019/009578.

* cited by examiner

ELECTRONIC DEVICE FOR BLURRING IMAGE OBTAINED BY COMBINING PLURAL IMAGES BASED ON DEPTH INFORMATION AND METHOD FOR DRIVING THE ELECTRONIC DEVICE

CROSS-REFERENCE TO RELATED APPLICATION(S)

This application is based on and claims priority under 35 U.S.C. § 119(a) of a Korean patent application number 10-2018-0092450, filed on Aug. 8, 2018, in the Korean Intellectual Property Office, the disclosure of which is incorporated by reference herein in its entirety.

BACKGROUND

1. Field

The disclosure relates to an electronic device having a plurality of cameras.

2. Description of Related Art

There is an increasing trend where a plurality of camera modules are applied to an electronic device. For example, a plurality of cameras may be mounted on different sides of an electronic device, and they may be used to capture images in different directions. Further, a plurality of cameras may be mounted on the same side of an electronic device, and they may be used to generate a corrected image (e.g., out-of-focus image or bokeh-effect image) in which at least parts of one or more external objects are blurred.

The most important factor deteriorating a picture quality in the case where an electronic device captures an image using cameras is a low-illumination environment, and thus research and development for acquiring a high-quality image using cameras in a low-illumination environment have been continuously made.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic device and a method thereof which can improve a picture quality in the case where a corrected image in which at least parts of one or more external objects are blurred using a plurality of cameras in a low-illumination environment.

Additional aspects will be set forth in part in the description which follows and, in part, will be apparent from the description or may be learned by practice of the presented embodiments.

In accordance with an aspect of the disclosure, an electronic device is provided. The electronic device includes a first camera deployed on one side of the electronic device, a second camera deployed on the one side, a memory, and at least one processor, wherein the at least one processor is configured to acquire a plurality of first image frames for one or more external objects using the first camera based on an input corresponding to a photographing signal, acquire a second image frame for the one or more external objects using the second camera while acquiring at least parts of the first image frames, generate depth information for the one or more external objects based on the image frame corresponding to the second image frame among the plurality of first image frames and the second image frame, generate a first corrected image by combining a plurality of designated image frames among the plurality of first image frames, and generate a second corrected image in which at least parts of the one or more external objects included in the first corrected image are blurred at least based on the depth information.

In accordance with another aspect of the disclosure, another electronic device is provided. The electronic device includes a first camera deployed on one side of the electronic device, a second camera deployed on the one side, a memory, and at least one processor, wherein the at least one processor is configured to acquire a plurality of first image frames for one or more external objects using the first camera based on an input corresponding to a photographing signal, acquire a second image frame for the one or more external objects using the second camera while acquiring at least parts of the first image frames, generate depth information for the one or more external objects based on the image frame corresponding to the second image frame among the plurality of first image frames and the second image frame, generate a first corrected image by combining a plurality of designated image frames among the plurality of first image frames based on the depth information, and generate a second corrected image in which at least parts of the one or more external objects included in the first corrected image are blurred at least based on the depth information.

In accordance with another aspect of the disclosure, a method for driving an electronic device is provided. The method includes acquiring a plurality of first image frames for one or more external objects using a first camera based on an input corresponding to a photographing signal, acquiring a second image frame for the one or more external objects using a second camera while acquiring at least parts of the first image frames, generating depth information for the one or more external objects based on the image frame corresponding to the second image frame among the plurality of first image frames and the second image frame, generating a first corrected image by combining a plurality of designated image frames among the plurality of first image frames, and generating a second corrected image in which at least parts of the one or more external objects included in the first corrected image are blurred at least based on the depth information.

According to the various embodiments of the disclosure, the picture quality can be improved in the case where the corrected image in which at least parts of the one or more external objects are blurred using the plurality of cameras in the low-illumination environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

By the term "substantially" it is meant that the recited characteristic, parameter, or value, need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
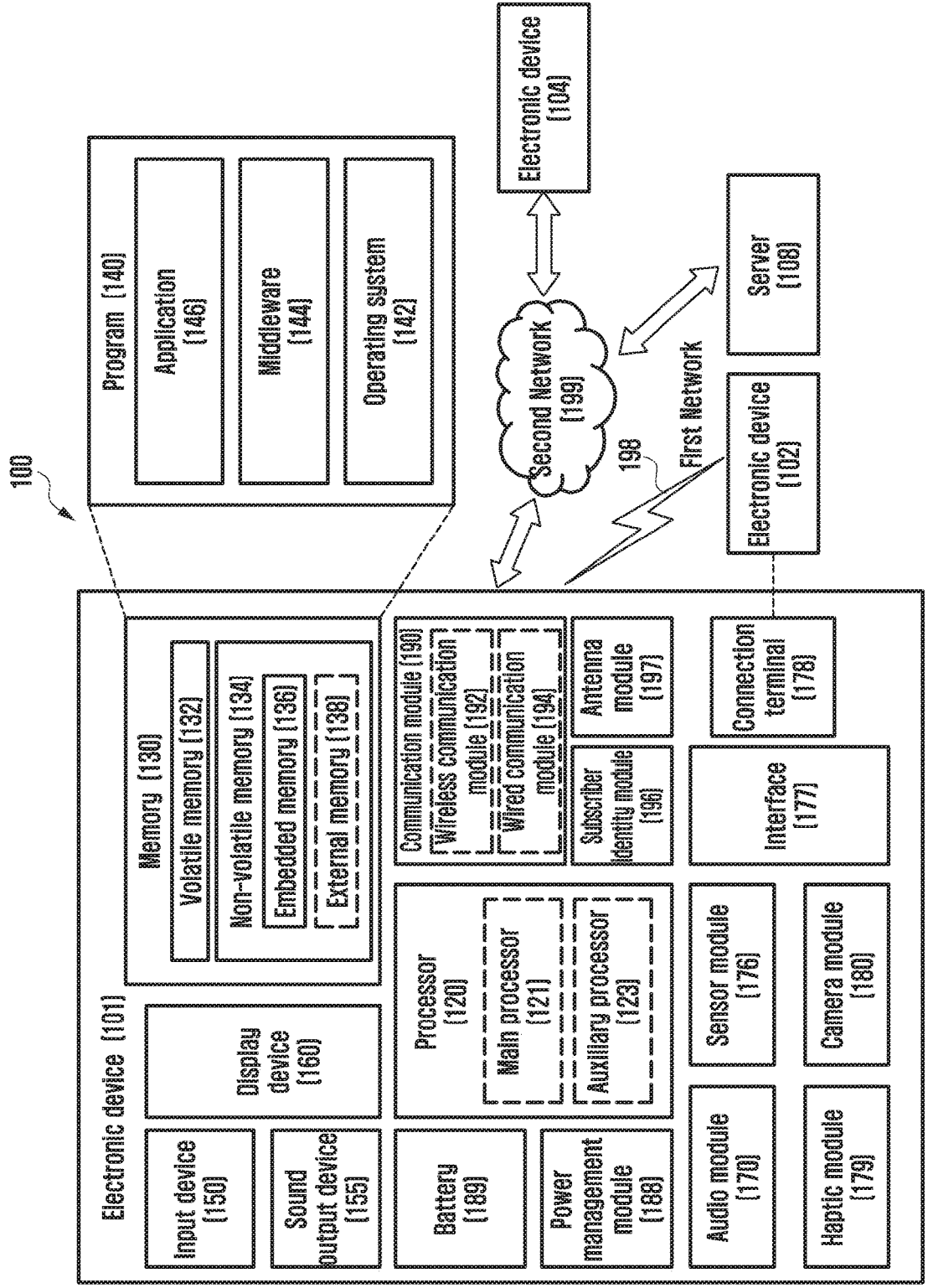
FIG. 1 is a block diagram of an electronic device in a network environment according to various embodiments of the disclosure.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may also communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134 which can include embedded memory 136 and/or eternal memory 138. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
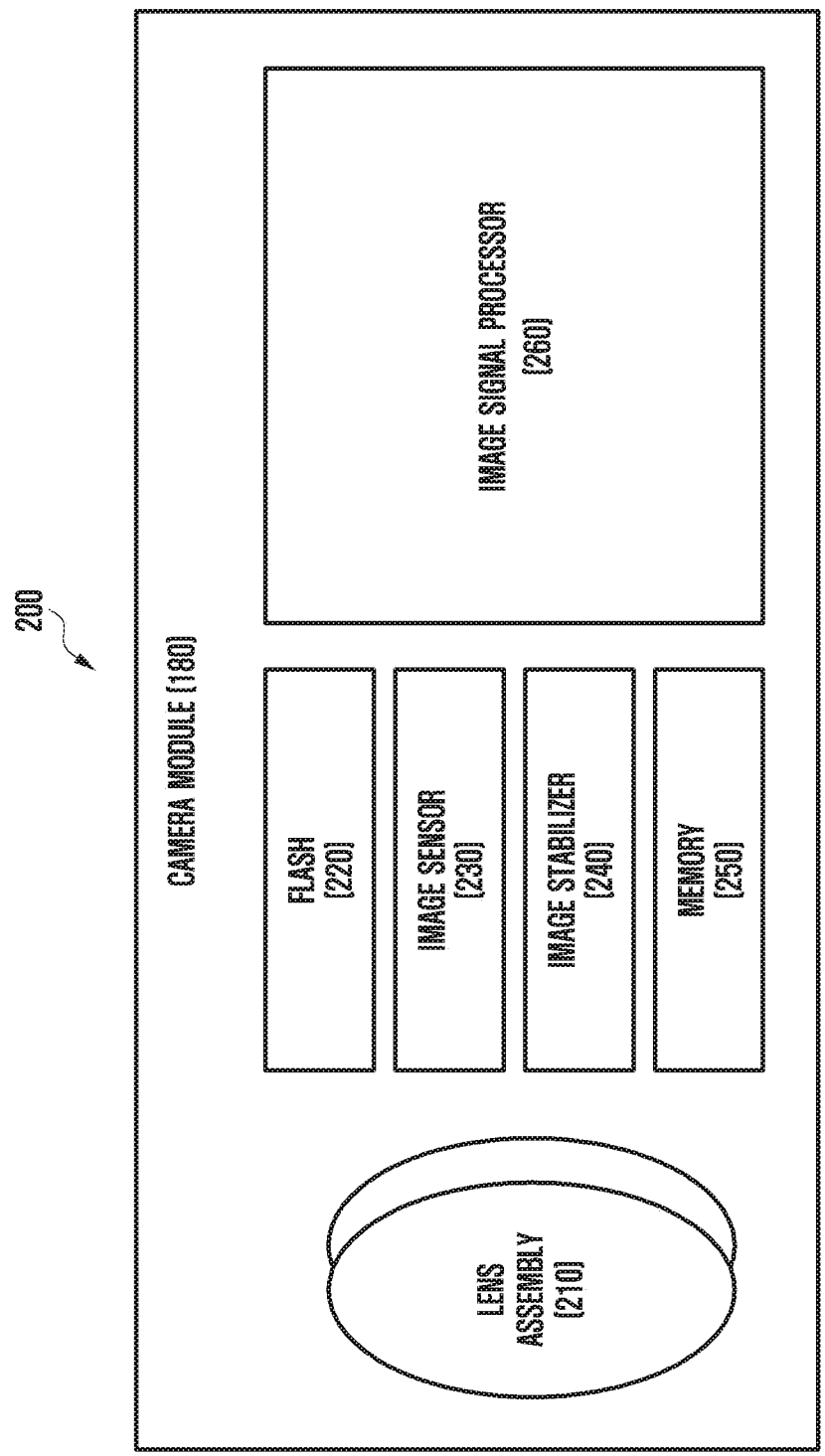
FIG. 2 is a block diagram of a camera module according to various embodiments of the disclosure.

FIG. 2 is a block diagram illustrating a camera module according to various embodiments of the disclosure.

Referring to FIG. 2, the camera module 180 of block diagram 200 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
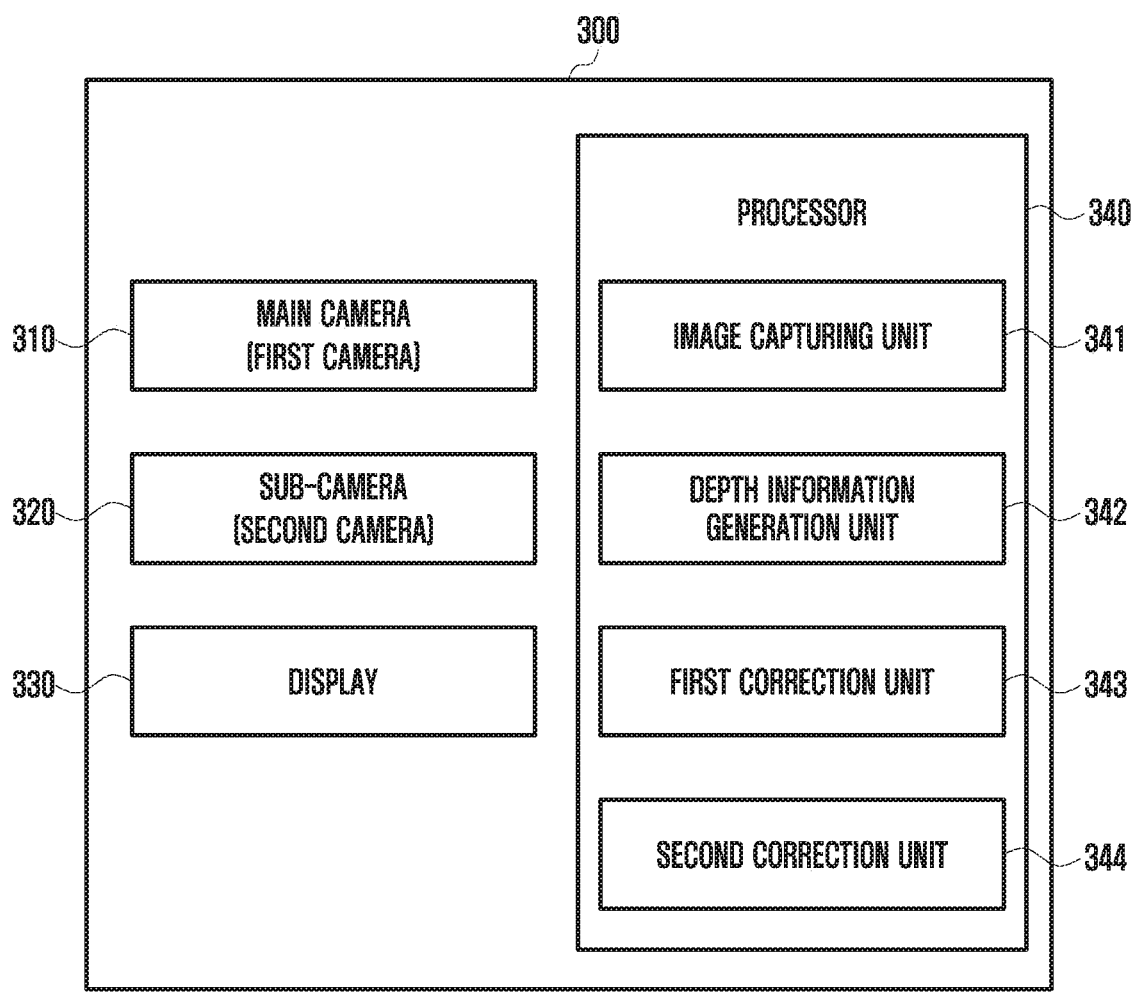
FIG. 3 is a block diagram illustrating a schematic configuration of an electronic device according to an embodiment of the disclosure.

FIG. 3 is a block diagram illustrating a schematic configuration of an electronic device according to an embodiment of the disclosure.

Referring to FIG. 3, an electronic device (e.g., electronic device 300 of FIG. 3) according to various embodiments of the disclosure may include a first camera (first camera 310 of FIG. 3) deployed on one side of the electronic device 300, a second camera (e.g., second camera 320 of FIG. 3) deployed on the one side, a memory (e.g., memory 130 of FIG. 1), and at least one processor (e.g., processor 340 of FIG. 3), wherein the processor 340 is configured to acquire a plurality of first image frames for one or more external objects using the first camera 310 based on an input corresponding to a photographing signal, acquire a second image frame for the one or more external objects using the second camera 320 while acquiring at least parts of the first image frames, generate depth information for the one or more external objects based on the image frame corresponding to the second image frame among the plurality of first image frames and the second image frame, generate a first corrected image by combining a plurality of designated image frames among the plurality of first image frames, and generate a second corrected image in which at least parts of the one or more external objects included in the first corrected image are blurred at least based on the depth information. The processor 340 may be further configured to determine a reference image frame among the plurality of first image frames based on a designated condition as a part of an operation of generating the first corrected image, generate a combined image by combining the plurality of designated image frames among the plurality of first image frames based on the reference image frame, perform image compensation with respect to the combined image, and generate the first corrected image by applying noise reduction with respect to the image-compensated combined image. The processor 340 may be still further configured to divide the reference image frame into a plurality of regions based on the depth information as a part of an operation of generating the first corrected image, determine operating weights for the plurality of regions, and generate the first corrected image by combining the plurality of designated image frames among the plurality of first image frames based on the operating weights. The first camera 310 may include a first lens group having a first focal length and a first view angle, and the second camera 320 may include a second lens group having a second focal length that is shorter than the first focal length and a second view angle that is equal to or larger than the first view angle. The processor 340 may be still further configured to acquire a plurality of second image frames corresponding to the plurality of first image frames as a part of an operation of acquiring the second image frame, and generate the depth information based on the reference image frame and the image frame corresponding to the reference image frame among the plurality of second image frames as a part of an operation of generating the depth information. The processor 340 may be still further configured to generate the depth information based on the first image frame acquired in a first frame period among a plurality of frame periods for acquiring the first image frames and the second image frame as a part of an operation of generating the depth information. The processor 340 may be still further configured to determine a second reference image frame among the plurality of first image frames acquired in a plurality of designated frame periods among a plurality of frame periods for acquiring the first image frames as a part of an operation of generating the depth information, and generate the depth information based on the second reference image frame and the image frame corresponding to the second reference image frame among the plurality of second image frames.

Another electronic device (e.g., electronic device 300 of FIG. 3) according to various embodiments of the disclosure may include a first camera (e.g., first camera 310) deployed on one side of the electronic device 300, a second camera (e.g., second camera 320 of FIG. 2) deployed on the one side, a memory (e.g., memory 130 of FIG. 1), and at least one processor (e.g., processor 340 of FIG. 3), wherein the processor 340 is configured to acquire a plurality of first image frames for one or more external objects using the first camera 310 based on an input corresponding to a photographing signal, acquire a second image frame for the one or more external objects using the second camera 320 while acquiring at least parts of the first image frames, generate depth information for the one or more external objects based on the image frame corresponding to the second image frame among the plurality of first image frames and the second image frame, generate a first corrected image by combining a plurality of designated image frames among the plurality of first image frames based on the depth information, and generate a second corrected image in which at least parts of the one or more external objects included in the first corrected image are blurred at least based on the depth information. The processor 340 may be further configured to determine a reference image frame among the plurality of first image frames based on a designated condition as a part of an operation of generating the first corrected image, divide the reference image frame into a plurality of regions based on the depth information, determine operating weights for the plurality of regions, and generate the first corrected image by combining the plurality of designated image frames among the plurality of first image frames based on the operating weights determined for the plurality of regions. The processor 340 may be still further configured to generate a combined image by combining the plurality of designated image frames among the plurality of first image frames based on the operating weights determined for the plurality of regions, apply image compensation with respect to the combined image based on the operating weights determined for the plurality of regions, and generate the first corrected image by applying noise reduction with respect to the combined image to which the image compensation has been applied based on the operating weights determined for the plurality of regions. The processor 340 may be still further configured to acquire a plurality of second image frames corresponding to the plurality of first image frames as a part of an operation of acquiring the second image frame. The processor 340 may be still further configured to generate the depth information based on the first image frame acquired in a first frame period among a plurality of frame periods for acquiring the first image frames and the second image frame as a part of an operation of generating the depth information. The processor 340 may be still further configured to determine a second reference image frame among the plurality of first image frames acquired in a plurality of designated frame periods among a plurality of frame periods for acquiring the first image frames as a part of an operation of generating the depth information, and generate the depth information based on the second reference image frame and the image frame corresponding to the second reference image frame among the plurality of second image frames.

The electronic device 300 (e.g., electronic device 101 of FIG. 1) according to an embodiment of the disclosure may include the first camera 310 (e.g., camera module 180 of FIG. 1), the second camera 320 (e.g., camera module 180 of FIG. 1), a display 330 (e.g., display device 160 of FIG. 1), and/or the processor 340 (e.g., processor 120 of FIG. 1).

According to an embodiment, the first camera 310 and the second camera 320 may be deployed on one side of the electronic device 300 to be spaced apart from each other for a designated distance. For example, the first camera 310 may be deployed on one side of the electronic device 300, and the second camera 320 may be deployed on the one side of the electronic device 300 to be spaced apart from the first camera 310 for the designated distance.

According to an embodiment, the first camera 310 and the second camera 320 may have the same optical property. For example, the optical property may mean a view angle of a lens, an iris numerical value (e.g., focus (F) value), a pixel pitch of an image sensor, or existence/nonexistence of a color filter, and the first camera 310 and the second camera 320 may be configured to have substantially the same conditions as described above.

According to another embodiment, the first camera 310 and the second camera 320 may have different optical properties. For example, the first camera 310 may include a first lens group having a first focal length and a first view angle, and a first image sensor, and the first lens group may be a standard view angle lens or a telephoto angle lens. The second camera 320 may include a second lens group having a second focal length that is shorter than the first focal length and a second view angle that is equal to or larger than the first view angle, and a second image sensor, and the second lens group may be a wide-angle lens.

According to an embodiment, any one of the first camera 310 and the second camera 320 may be defined as a main camera, and the other may be defined as a sub-camera.

According to an embodiment, at least a part of the first camera 310 and the second camera 320 may include an illumination sensor. For example, the illumination sensor may be deployed adjacent to the first lens group or the second lens group on one side of the electronic device 300.

According to another embodiment, the illumination sensor may be omitted, and in this case, the image sensor of the first camera 310 or the image sensor of the second camera 320 may be used as the illumination sensor.

According to an embodiment, the display 330 may display a preview image, a captured image, or a user interface related to camera functions under the control of the processor 340. For example, the user interface may provide a screen for zoom adjustment function, preview mode, focus region selection, or photographing command selection.

According to an embodiment, the processor 340 may be operatively connected to the first camera 310, the second camera 320, or the display 330, and it may perform overall control of the first camera 310, the second camera 320, or the display 330. For example, the processor 340 may control drive (on) of the first camera 310 and the second camera 320, drive mode (e.g., sleep, standby, or active), frame rate, or digital zoom.

According to an embodiment, the processor 340 may acquire image frames for one or more external objects using the first camera 310 and/or the second camera 320, and it may generate a corrected image (e.g., out-of-focus image or bokeh-effect image) in which at least parts of the one or more external objects are blurred through correction of the acquired image frames.

Hereinafter, in the description, the term "corrected image in which at least parts of one or more external objects are blurred" is defined as "bokeh-effect image". The "bokeh-effect image" used in the description may be substantially the same expression as "out-focus image", "out-of-focus image", or "bokeh image", and it may mean a defocused blur image in which a remaining portion excluding a specific portion (e.g., focus region 511 of FIG. 5A) among the whole image region has been defocused.

According to an embodiment, the processor 340 may include an image capturing unit 341, a depth information generation unit 342, a first correction unit 343, or a second correction unit 344.

According to an embodiment, the image capturing unit 341 may acquire at least one image frame by controlling drive (on) of the first camera 310 and the second camera 320, drive mode (e.g., sleep, standby, or active), frame rate, or digital zoom. For example, the image capturing unit 341 may acquire image frames for one or more external objects using the first camera 310 and/or the second camera 320 in response to a user input corresponding to a photographing signal.

Figure 4:
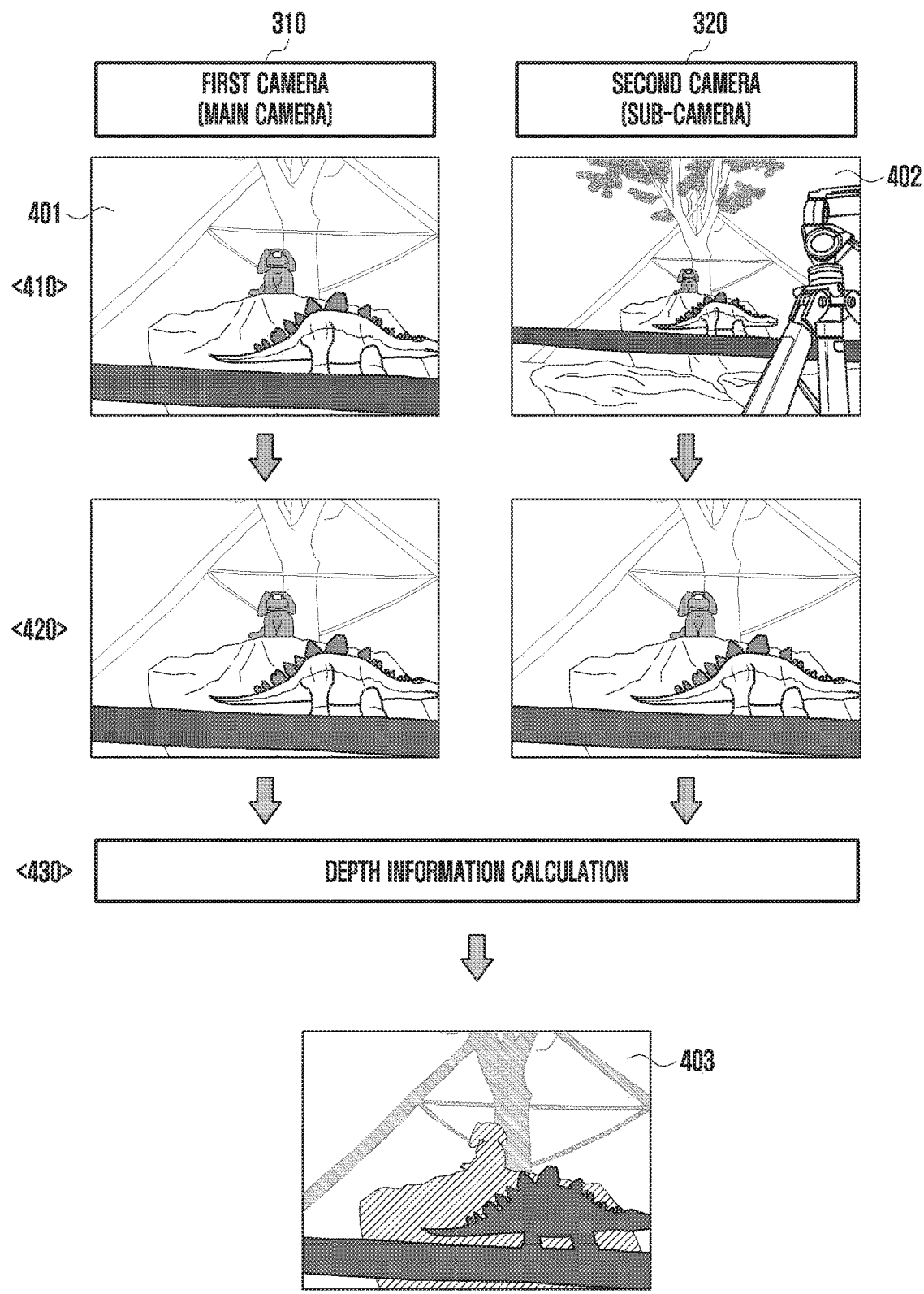
FIG. 4 is a diagram explaining a method by an electronic device for generating depth information according to an embodiment of the disclosure.

FIG. 4 is a diagram explaining a method by an electronic device for generating depth information according to an embodiment of the disclosure.

Referring to FIG. 4, as another example, if a user input corresponding to a photographing signal is received, the image capturing unit 341 may acquire a plurality of first image frames 401 for the one or more external objects using the first camera 310, and it may acquire a plurality of second image frames 402 for the one or more external objects using the second camera 320 while acquiring the plurality of first image frames 401. According to a certain embodiment, the image capturing unit 341 may acquire at least one of the second image frames 402 using the second camera 320 while acquiring at least parts of the plurality of first image frames 401.

According to an embodiment, the depth information generation unit 342 may generate a depth map 403 based on the image frames acquired using the first camera 310 and the image frames acquired using the second camera 320. For example, the depth information generation unit 342 may generate the depth map 403 including depth information for one or more external objects based on the designated image frame that is any one of the plurality of first image frames 401 acquired using the first camera 310 and the second image frame 402 corresponding to the designated image frame and acquired using the second camera 320. For example, the fact that the second image frame 402 corresponds to the designated image frame may mean that the two image frames have the same time information. As another example, the depth information generation unit 342 may generate the depth map 403 using the first image frames 401 and the second image frames 402 captured at the same time (e.g., frame period).

According to an embodiment, the depth information generation unit 342 may generate the depth information based on the first image frames 401 and the second image frames 402 that are acquired in the first frame period among the plurality of frame periods in which the plurality of first image frames 401 are acquired.

According to another embodiment, the depth information generation unit 342 may determine any one of the plurality of first image frames 401 based on the designated condition, and it may generate the depth information based on the second image frame 402 corresponding to the determined image frame. For example, the designated condition may include the blur degree of the first image frame or the handshake amount. As another example, the depth information generation unit 342 may determine the image frame having the lowest blur degree and/or the smallest handshake amount among the plurality of first image frames 401 as the designated image frame.

According to an embodiment, the first correction unit 343 may generate a single image having an improved picture quality by combining the designated image frames among the plurality of image frames acquired using the first camera 310. For example, the first correction unit 343 may generate a first corrected image by combining the plurality of image frames acquired using the first camera 310. Further, the first correction unit 343 may generate the first corrected image by combining only parts of the plurality of image frames acquired using the first camera 310. According to a certain embodiment, the first correction unit 343 may generate a single image having an improved picture quality by combining the plurality of image frames acquired using the second camera 320 in a similar manner to combining of the first image frames 401.

According to an embodiment, the first correction unit 343 may generate the first corrected image by combining the plurality of designated image frames among the plurality of first image frames 401. For example, the first correction unit 343 may measure an external illumination using an illumination sensor, and it may determine the number of designated image frames used to combine the images based on the external illumination. According to an embodiment, the first correction unit 343 may configure a relatively small number of the designated image frames as the external illumination becomes brighter, and it may configure a relatively large number of the designated image frames as the external illumination becomes darker. For example, if the external illumination is lowered below a designated value, the first correction unit 343 may generate the first corrected image by combining the plurality of first image frames 401 in all.

According to an embodiment, the first correction unit 343 may determine a reference image frame among the designated image frames, and it may combine the designated image frames based on the reference image frame. For example, the designated condition may include the blur degree of the first image frame or the handshake amount. As another example, the first correction unit 343 may determine the image frame having the lowest blur degree and/or the smallest handshake amount among the plurality of first image frames 401 as the reference image frame.

According to a certain embodiment, the first correction unit 343 may further use the depth information in combining the designated image frames. For example, the first correction unit 343 may divide the reference image frame into a plurality of regions based on the depth information, and it may determine operating weights for the plurality of regions.

Figure 5A:
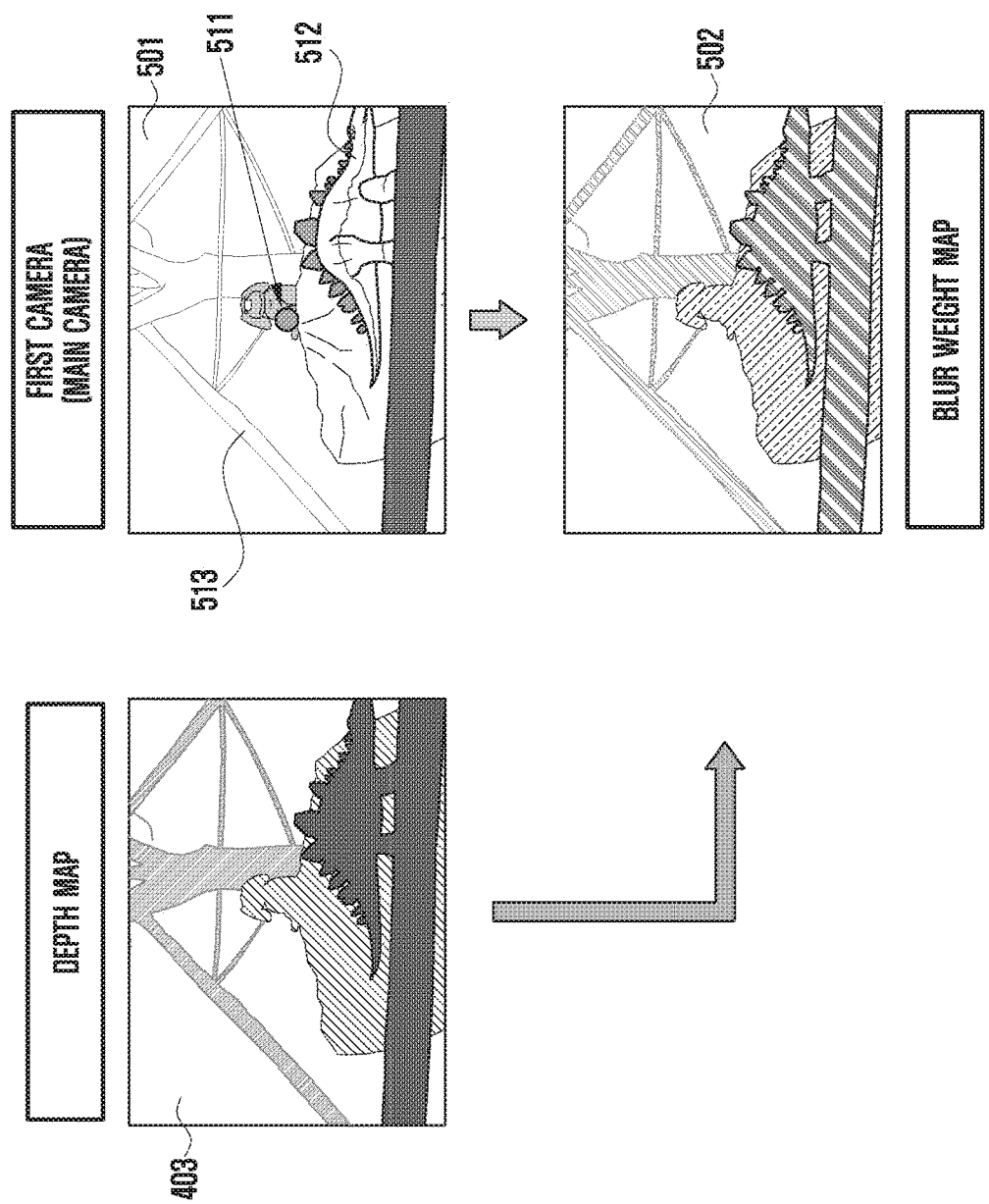
FIG. 5A is a diagram explaining a method for generating a blur image in which a remaining portion excluding a specific portion is defocused using a depth map according to an embodiment of the disclosure.

FIG. 5A is a diagram explaining a method for generating a blur image in which a remaining portion excluding a specific portion is defocused using a depth map according to an embodiment of the disclosure.

Referring to FIG. 5A, based on the depth information, the first correction unit 343 may divide the reference image frame into a first region that is a focus region 511, a second region (e.g., foreground region 512) having a focal length that is shorter than the focal length of the first region, or a third region (e.g., background region 513) having a focal length that is longer than the focal length of the first region. According to an embodiment, the first correction unit 343 may differently determine the operating weights for the divided first to third regions, and it may configure a relatively high operating weight with respect to the first region that is the focus region 511. According to an embodiment, the first correction unit 343 may combine the designated image frames based on the determined operating weight. Because the electronic device 300 according to various embodiments of the disclosure generates the first corrected image using the depth information, it can use more memory resources or processing resources in improving the picture quality for the focus region 511, and thus it can generate a bokeh-effect image with an improved picture quality.

According to an embodiment, the second correction unit 344 may generate a second corrected image that is a bokeh-effect image through correction of the first corrected image. For example, the second correction unit 344 may generate the second corrected image in which at least parts of one or more external objects included in the first corrected image are blurred at least based on the depth information. According to an embodiment, the second correction unit 344 may generate the second corrected image by blurring the remaining region excluding the focus region 511 from the first corrected image using the depth information.

According to an embodiment, if the second corrected image is generated, the second correction unit 344 may output the second corrected image by controlling the display 330.

According to a certain embodiment, at least parts of the image capturing unit 341, the depth information generation unit 342, the first correction unit 343, and the second correction unit 344 in the processor 340 may be included in an image signal processor 340 (e.g., image signal processor 340 or 260 of FIG. 2). For example, at least partial operations of the respective operations of the image capturing unit 341, the depth information generation unit 342, the first correction unit 343, and the second correction unit 344 may be performed by the image signal processor 340 or 260.

Referring to FIGS. 3, 4 and 5A, a depth information generation unit (e.g., depth information generation unit 342 of FIG. 3) of a processor (e.g., processor 340 of FIG. 3) according to an embodiment may generate the depth information using the parallax between the first camera (e.g., first camera 310 of FIG. 3) and the second camera (e.g., second camera 320 of FIG. 3).

According to an embodiment, as denoted by 410 in FIG. 4, the depth information generation unit 342 may acquire the first image frame 401 using the first camera 310 and the second image frame 402 corresponding to the first image frame 401 using the second camera 320. According to an illustrated example, the first image frame 401 may be an image obtained by photographing one or more external objects with a first view angle in a specific frame period (e.g., first frame period or designated frame period), and the second image frame 402 may be and image obtained by photographing the one or more external objects with a second view angle that is larger than the first view angle in the specific frame period.

According to an embodiment, as denoted by 420 of FIG. 4, the depth information generation unit 342 may adjust the respective view angles of the first image frame 401 and the second image frame 402 and coordinates of the focal regions 511 so that they respectively coincide with each other. According to an embodiment, the depth information generation unit 342 may adjust the alignment of the first image frame 401 and the second image frame 402 by matching the respective objects of the first image frame 401 and the second image frame 402 with each other. For example, the depth information generation unit 342 may shift the second image frame 402 so that the coordinates of the focus region 511 of the first image frame 401 coincide with the coordinates of the focus region 511 of the second image frame 402. According to an embodiment, if the alignment of the second image frame 402 is adjusted, the depth information generation unit 342 may adjust the first image frame 401 and the second image frame 402 with the same view angle based on calibration information of the first camera 310 and the second camera 320. For example, the depth information generation unit 342 may crop the second image frame 402 so that the second image frame 402 has the same view angle as the view angle of the first image frame 401.

According to an embodiment, the calibration information may be values determined through a calibration process during manufacturing of the first camera 310 and the second camera 320, and for example, the calibration information may include an intrinsic parameter and an extrinsic parameter. The intrinsic parameter may be the property of each camera, and it may include an optical center, a focal length, or a lens distortion. The extrinsic parameter may indicate a relative location between the first camera 310 and the second camera 320, and it may be a tilt or shift.

According to an embodiment, as denoted by 430 of FIG. 4, if the view angles of the first image frame 401 and the second image frame 402 and the coordinates of the focus regions 511 respectively coincide with each other, the depth information generation unit 342 may generate the depth map 403 while matching the remaining objects excluding the external objects corresponding to the focus regions 511. For example, the depth information generation unit 342 may search for the same object from the first image frame 401 and the second image frame 402, and it may convert the shift degree in which the coordinates corresponding to the same object in the respective image frames are shifted into the depth information. According to an embodiment, if the shift degree in which the coordinates corresponding to the same object in the respective image frames are shifted is high, the depth information generation unit 342 may determine that the corresponding object is at a short distance, whereas if the shift degree in which the coordinates corresponding to the same object in the respective image frames are shifted is low, the depth information generation unit 342 may determine that the corresponding object is at a long distance.

According to various embodiments, the electronic device 300 according to the disclosure may acquire the depth information using various methods in addition to that as exemplarily mentioned above. For example, methods by the electronic device 300 for acquiring the depth information are disclosed in Korean Unexamined Patent Application Publication No. 10-2017-0091496, Korean Unexamined Patent Application Publication No. 10-2017-008279, and Korean Unexamined Patent Application Publication No. 10-2017-0060414.

A second correction unit (e.g., second correction unit 344 of FIG. 3) of a processor (e.g., processor 340 of FIG. 3) according to an embodiment may determine a focus region 511 from a first corrected image 501, and it may generate a blur weight map 502 based on the focus region 511 and the depth map 403. For example, the second correction unit 344 may divide the first corrected image 501 into a plurality of regions based on the focus region 511, and it may differently determine the blur weights for the plurality of regions. According to an embodiment, the second correction unit 344 may configure a relatively low blur weight with respect to a foreground region 512 located at a shorter distance than the distance of the focus region 511, and it may configure a relatively high blur weight with respect to a background region 513 located at a longer distance than the distance of the focus region 511. For example, the second correction unit 344 may configure the blur weight as a value in the range of 0 to 255, and in this case, the second correction unit 344 may configure the blur weight that is close to 0 with respect to the foreground region 512, whereas the second correction unit 344 may configure the blur weight that is close to 255 with respect to the background region 513. Further, regardless of the division of the foreground region 512 and the background region 513, the second correction unit 344 may configure a low blur weight with respect to a region relatively close to the focus region 511, whereas it may configure a high blur weight with respect to a region relatively far from the focus region 511.

Figure 5B:
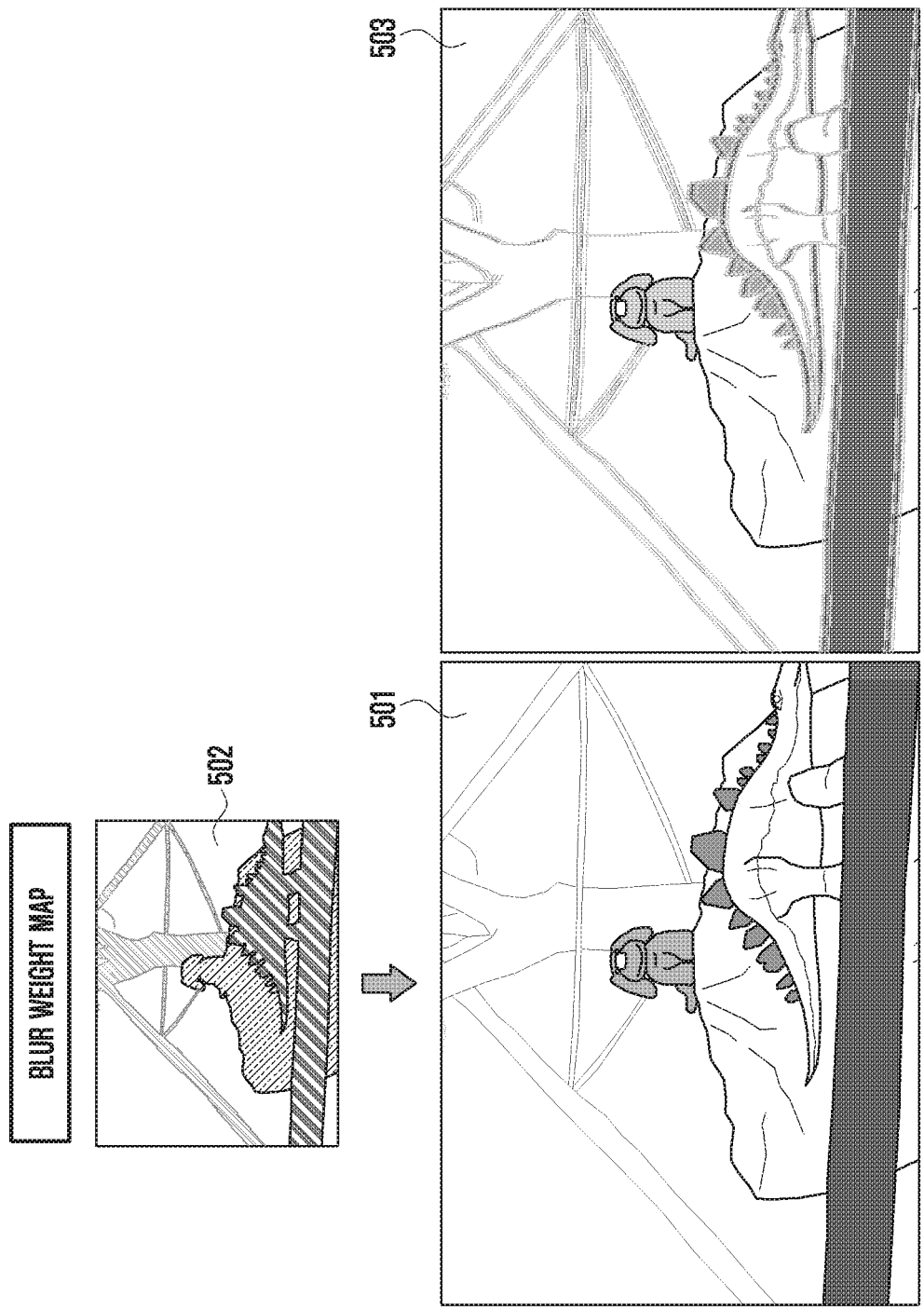
FIG. 5B is a diagram explaining a method for generating a blur image in which a remaining portion excluding a specific portion is defocused using a depth map according to an embodiment of the disclosure.

Referring to FIGS. 3, 4 and 5B, the second correction unit 344 of the processor 340 according to an embodiment may generate a second corrected image 503 by applying the blur effects for the plurality of regions of the first corrected image 501 based on the blur weight map 502. For example, the second correction unit 344 may apply a high blur effect with respect to a region having a relatively high blur weight, whereas it may apply a low blur effect with respect to a region having a relatively low blur weight.

A method for driving an electronic device (e.g., electronic device 300 of FIG. 3) according to various embodiments of the disclosure may include acquiring a plurality of first image frames for one or more external objects using a first camera (e.g., first camera 310 of FIG. 3) based on an input corresponding to a photographing signal, acquiring a second image frame for the one or more external objects using a second camera (e.g., second camera 320 of FIG. 3) while acquiring at least parts of the first image frames, generating depth information for the one or more external objects based on the image frame corresponding to the second image frame among the plurality of first image frames and the second image frame, generating a first corrected image by combining a plurality of designated image frames among the plurality of first image frames, and generating a second corrected image in which at least parts of the one or more external objects included in the first corrected image are blurred at least based on the depth information. Generating the first corrected image may include determining a reference image frame among the plurality of first image frames based on a designated condition, generating a combined image by combining the plurality of designated image frames among the plurality of first image frames based on the reference image frame, performing image compensation with respect to the combined image, and generating the first corrected image by applying noise reduction with respect to the combined image to which the image compensation has been applied. Generating the first corrected image may include dividing the reference image frame into a plurality of regions based on the depth information, determining operating weights for the plurality of regions, and generating the first corrected image by combining the plurality of designated image frames among the plurality of first image frames based on the operating weights. Acquiring the second image frame may include acquiring a plurality of second image frames corresponding to the plurality of first image frames. Generating the depth information may include generating the depth information based on the reference image frame and the image frame corresponding to the reference image frame among the plurality of second image frames. Generating the depth information may include generating the depth information based on the first image frame acquired in a first frame period among a plurality of frame periods for acquiring the first image frames and the second image frame. Generating the depth information may include determining a second reference image frame among the plurality of first image frames acquired in a plurality of designated frame periods among a plurality of frame periods for acquiring the first image frames, and generating the depth information based on the second reference image frame and the image frame corresponding to the second reference image frame among the plurality of second image frames.

Figure 6:
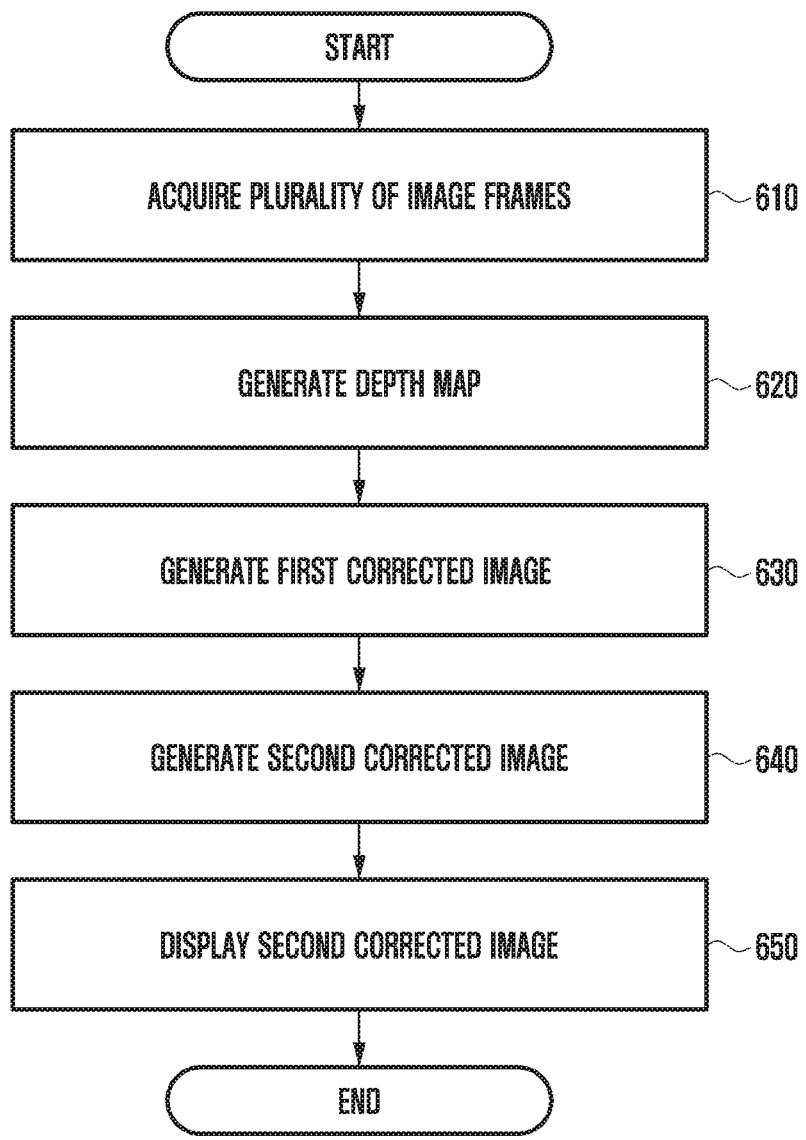
FIG. 6 is a flowchart illustrating a method for operating an electronic device according to an embodiment of the disclosure.

FIG. 6 is a flowchart illustrating a method for operating an electronic device according to an embodiment of the disclosure.

Figure 7:
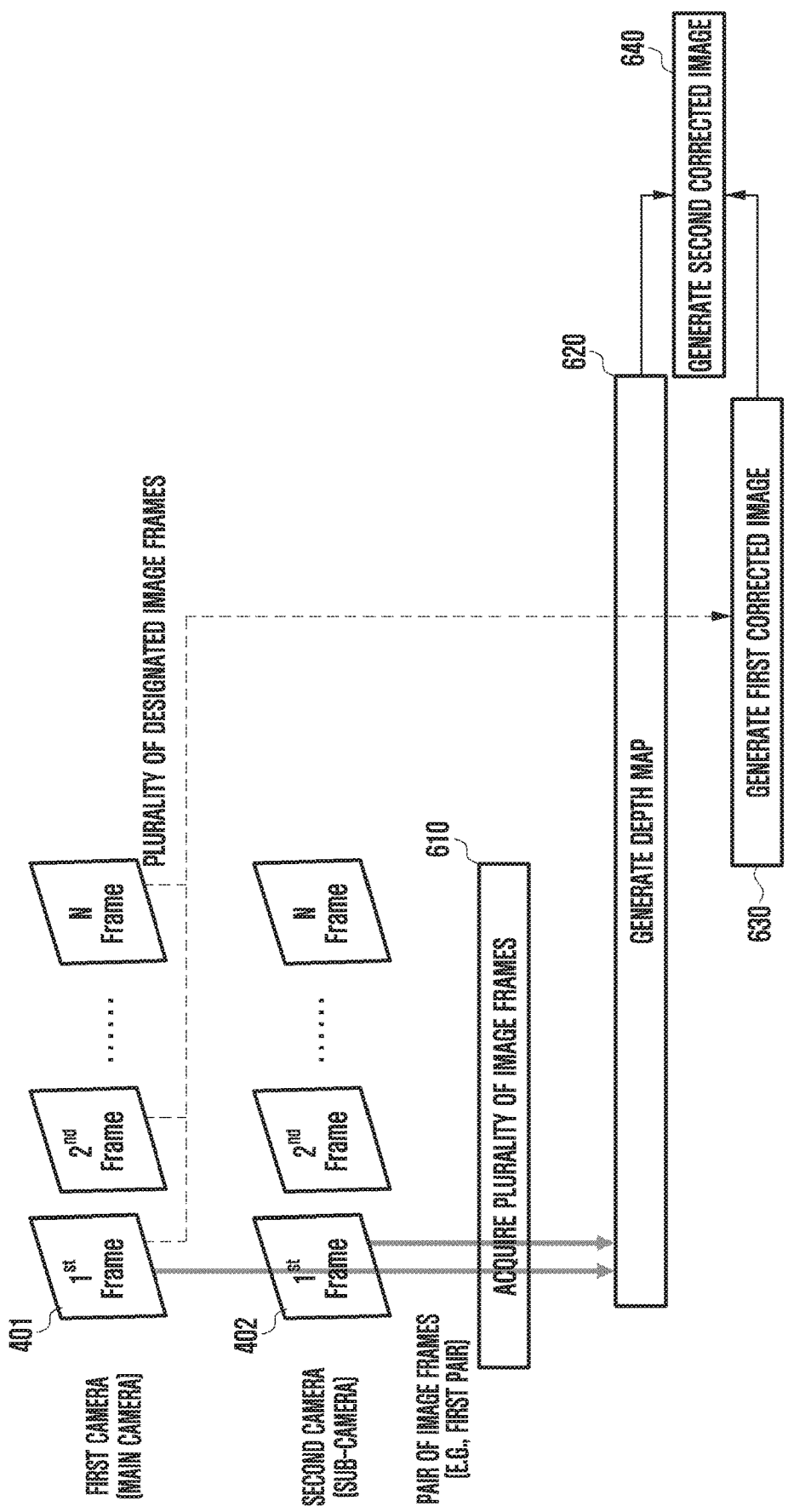
FIG. 7 is a diagram illustrating a method by an electronic device for generating a blur image in which a remaining portion excluding a specific portion is defocused using a plurality of cameras according to an embodiment of the disclosure.

FIG. 7 is a diagram illustrating a method by an electronic device for generating a blur image in which a remaining portion excluding a specific portion is defocused using a plurality of cameras according to an embodiment of the disclosure. Hereinafter, with reference to FIGS. 6 and 7, a method for operating an electronic device according to an embodiment of the disclosure will be described.

At operation 610, a processor (e.g., processor 340 of FIG. 3) according to an embodiment may acquire a plurality of image frames using a first camera (e.g., first camera 310 of FIG. 3) (main camera) and a second camera (e.g., second camera 320 of FIG. 3) (sub-camera). For example, the processor 340 may acquire a plurality of first image frames 401 for one or more external objects through the first camera 310 based on a user input corresponding to a photographing signal, and it may acquire at least one second image frame 402 while acquiring at least parts of the plurality of first image frames 401.

At operation 620, the processor 340 according to an embodiment may generate a depth map 403 based on the first image frames 401 and the second image frames 402 corresponding to the first image frames 401. For example, the first image frames 401 and the second image frames 402 may be image frames acquired in a first frame period among a plurality of frame periods in which the first image frames 401 are acquired.

At operation 630, the processor 340 according to an embodiment may generate a first corrected image by combining a plurality of designated image frames among the plurality of first image frames 401. For example, the processor 340 may measure external illumination using an illumination sensor, and the processor 340 may determine the number of designated image frames used to combine the images based on the external illumination. According to an embodiment, the processor 340 may configure a relatively small number of the designated image frames as the external illumination becomes brighter, and it may configure a relatively large number of the designated image frames as the external illumination becomes darker. For example, if the external illumination is lowered below a designated value, the processor 340 may generate the first corrected image by combining the plurality of first image frames 401 in all. Operation 630 will be described in detail later with reference to FIGS. 8 and 9.

At operation 640, the processor 340 according to an embodiment may generate a second corrected image by partially applying a blur effect to the first corrected image based on the depth map 403. For example, the processor 340 may generate the second corrected image in which at least parts of one or more external objects included in the first corrected image are blurred at least based on the depth information.

At operation 650, the processor 340 according to an embodiment may control the display 330 to display the second corrected image.

Figure 8:
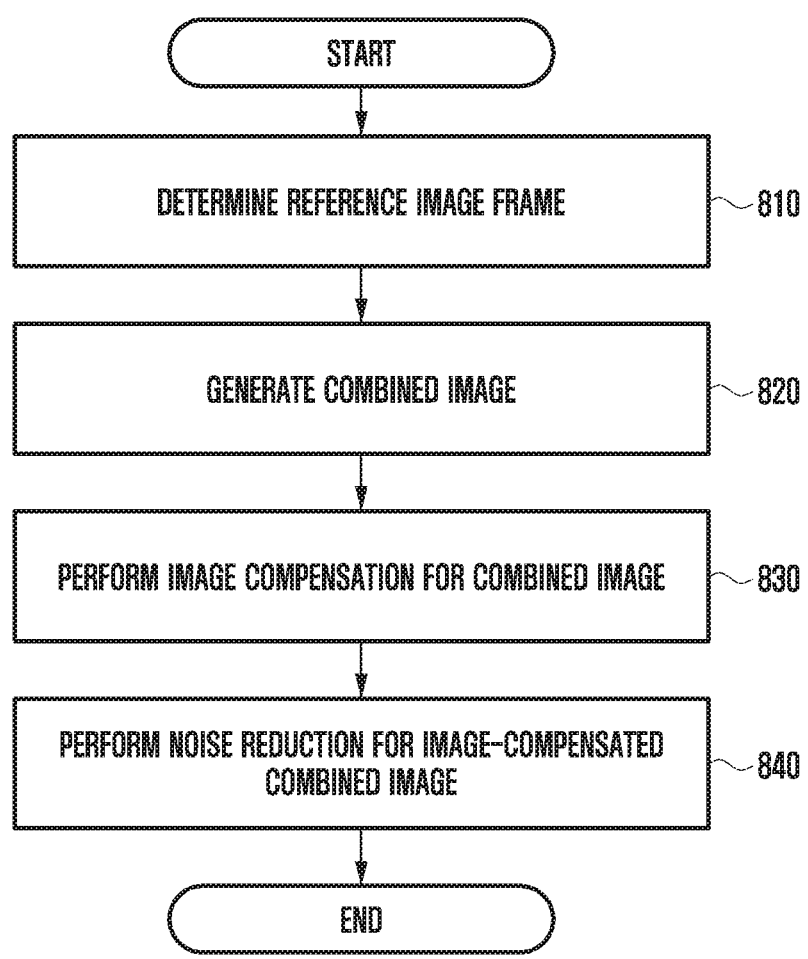
FIG. 8 is a flowchart illustrating a method by an electronic device for generating a first corrected image according to an embodiment of the disclosure.

FIG. 8 is a flowchart illustrating a method by an electronic device for generating a first corrected image according to an embodiment of the disclosure.

Figure 9:
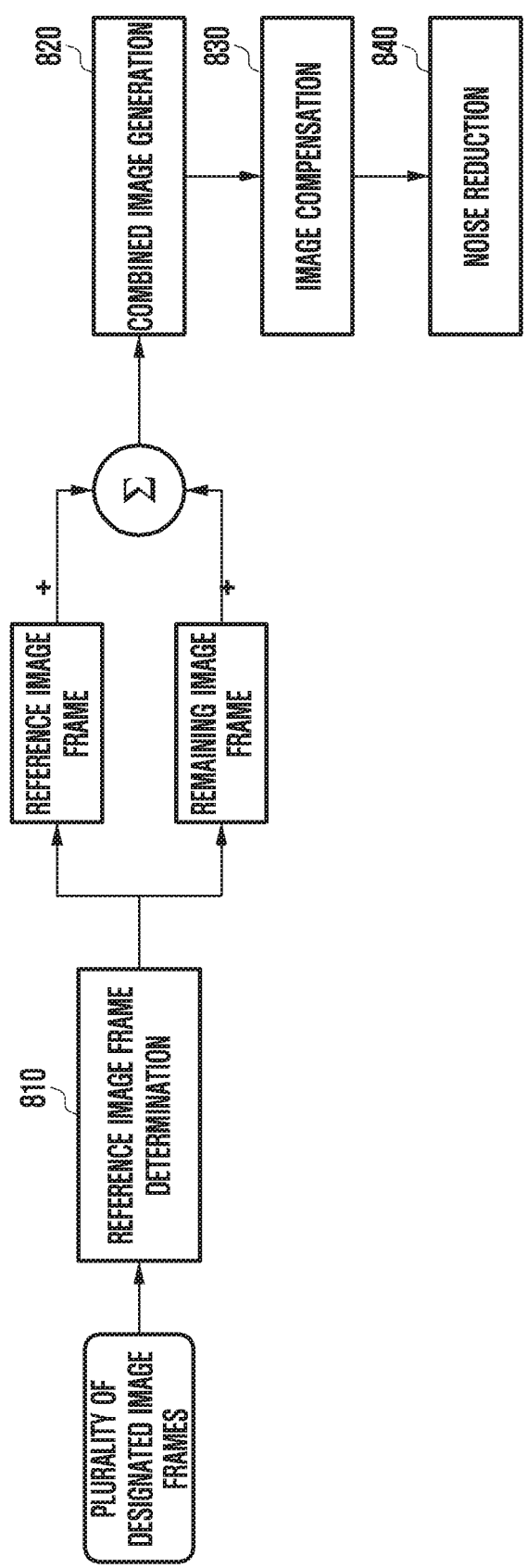
FIG. 9 is a diagram illustrating in detail a method by an electronic device for generating a first corrected image according to an embodiment of the disclosure.

FIG. 9 is a diagram illustrating in detail a method by an electronic device for generating a first corrected image according to an embodiment of the disclosure. For example, FIGS. 8 and 9 are diagrams explaining in detail operation 630 illustrated in FIG. 6. Hereinafter, with reference to FIGS. 8 and 9, a method by the electronic device 300 for generating a first corrected image according to an embodiment will be described.

At operation 810, a processor (e.g., processor 340 of FIG. 3) according to an embodiment may determine a plurality of designated image frames among a plurality of first image frames 401, and it may determine a reference image frame among the plurality of designated image frames. For example, the designated condition may include the blur degree of the first image frame or the handshake amount. As another example, the processor 340 may determine the image frame having the lowest blur degree and/or the smallest handshake amount among the plurality of first image frames 401 as the reference image frame. According to an embodiment, the processor 340 may determine the handshake amount based on the movement amount measured using an acceleration sensor during an exposure time of an image sensor.

At operation 820, the processor 340 according to an embodiment may generate a combined image by combining the designated image frames that are at least parts of the plurality of first image frames 401 based on the reference image frame. For example, the processor 340 may combine the plurality of objects included in the remaining image frames based on the plurality of objects included in the reference image frame with the reference image frame.

At operation 830, the processor 340 according to an embodiment may perform image compensation with respect to the combined image. For example, the processor 340 may perform a compensation algorithm to improve brightness, contrast, or sharpness with respect to the combined image. According to various embodiments, the compensation algorithm to improve the brightness, contrast, or sharpness may be one of methods known in the corresponding technical field. For example, the processor 340 may perform the compensation algorithm to improve the brightness, contrast, or sharpness, and it may perform image compensation with respect to the combined image using a low-illumination image processing method disclosed in Korean Unexamined Patent Application Publication No. 10-2017-0046498 or Korean Registered Patent Publication No. 10-1442153.

At operation 840, the processor 340 according to an embodiment may generate the first corrected image by performing noise reduction with respect to the image-compensated combined image. According to various embodiments, the compensation algorithm to reduce a noise of the image may be one of methods known in the corresponding technical field. For example, the processor 340 may perform the noise reduction with respect to the combined image using a noise reduction method disclosed in Korean Registered Patent Publication No. 10-1336234 or Korean Registered Patent Publication No. 10-1727285.

Figure 10:
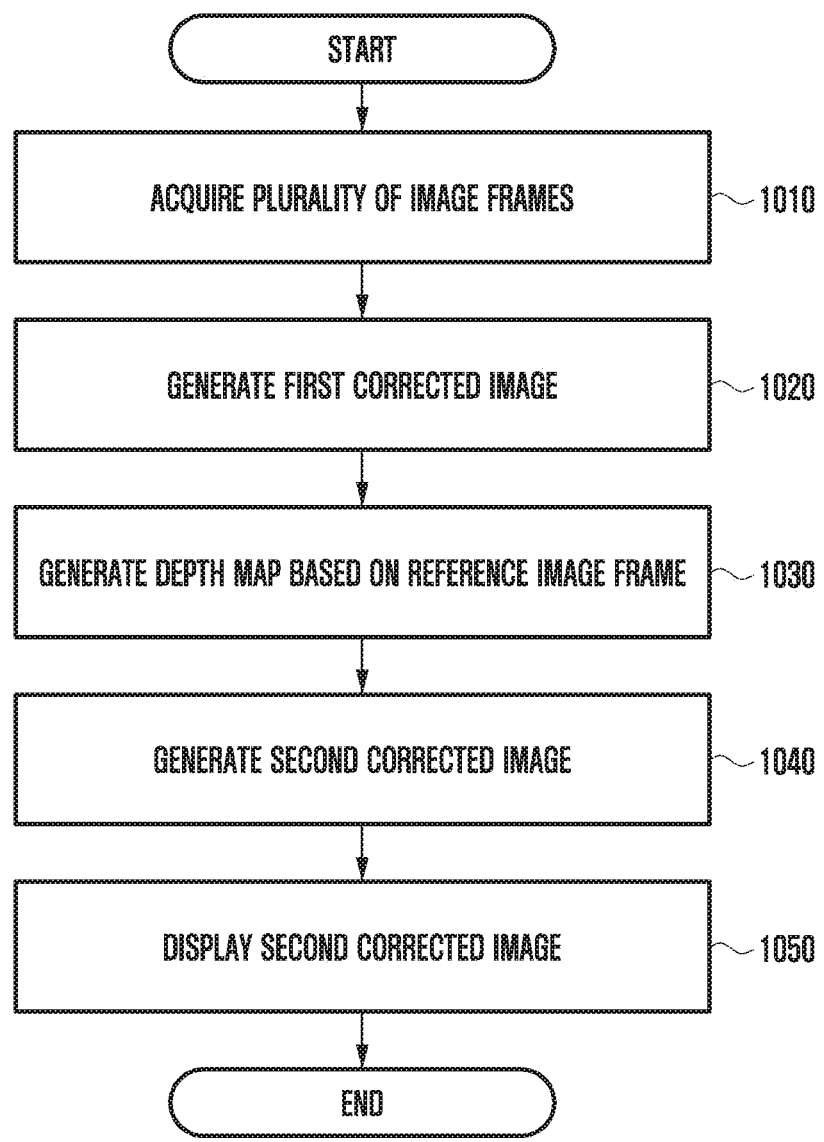
FIG. 10 is a flowchart illustrating a method for operating an electronic device according to another embodiment of the disclosure.

FIG. 10 is a flowchart illustrating a method for operating an electronic device according to another embodiment of the disclosure.

Figure 11:
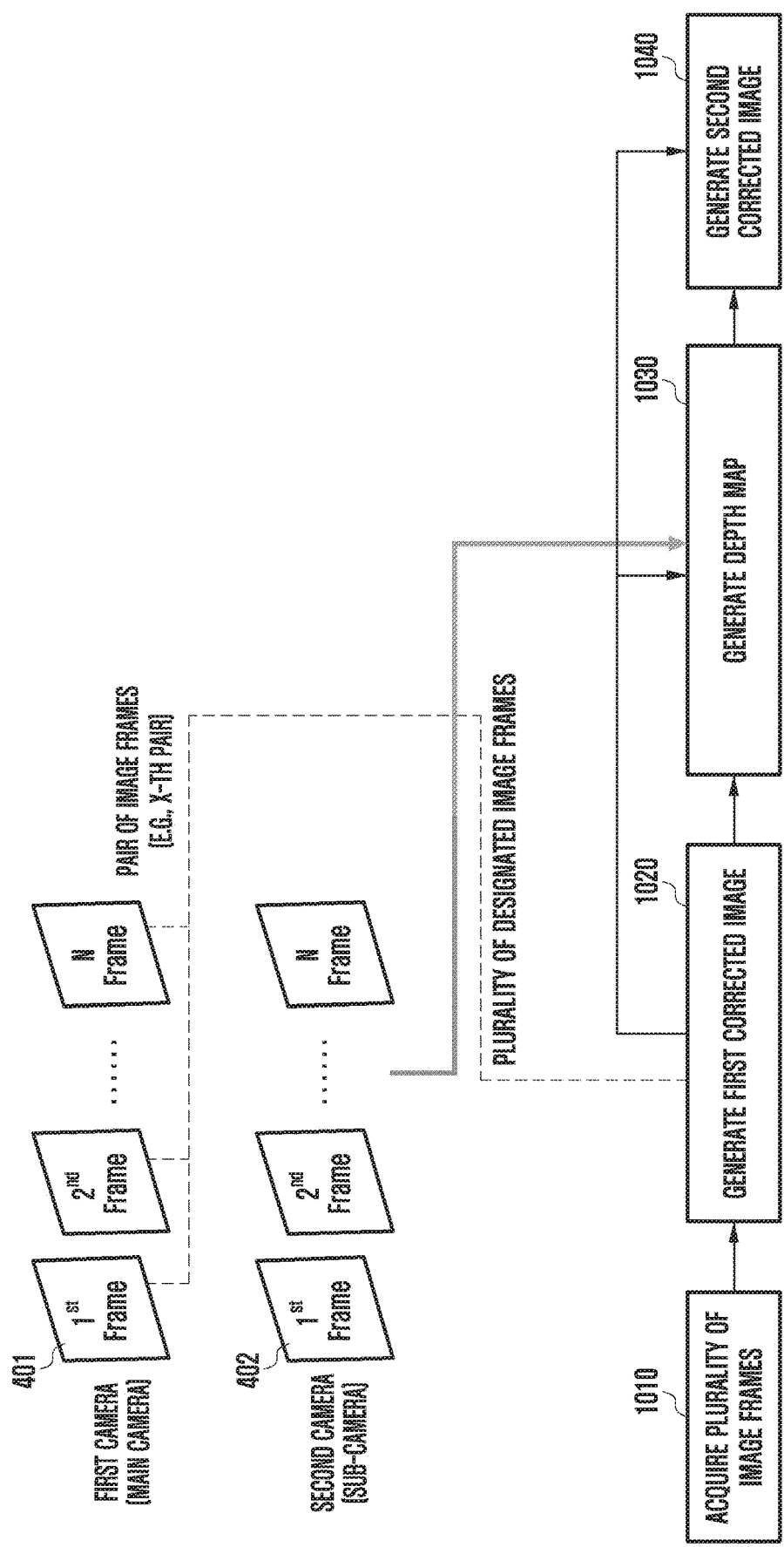
FIG. 11 is a diagram illustrating a method by an electronic device for generating a blur image in which a remaining portion excluding a specific portion is defocused using a plurality of cameras according to another embodiment of the disclosure.

FIG. 11 is a diagram illustrating a method by an electronic device for generating a blur image in which a remaining portion excluding a specific portion is defocused using a plurality of cameras according to another embodiment of the disclosure. Hereinafter, with reference to FIGS. 10 and 11, a method for operating an electronic device according to another embodiment of the disclosure will be described.

At operation 1010, the processor 340 according to another embodiment may acquire a plurality of image frames using a first camera (e.g., first camera 310 of FIG. 3) (main camera) and a second camera (e.g., second camera 320 of FIG. 3) (sub-camera). For example, the processor 340 may acquire a plurality of first image frames 401 for one or more external objects through the first camera 310 based on a user input corresponding to a photographing signal, and it may acquire at least one second image frame 402 while acquiring at least parts of the plurality of first image frames 401.

At operation 1020, the processor 340 according to another embodiment may generate a first corrected image by combining a plurality of designated image frames among the plurality of first image frames 401. For example, the processor 340 may measure external illumination using an illumination sensor, and it may determine the number of designated image frames used to combine the images based on the external illumination. According to another embodiment, the processor 340 may configure a relatively small number of the designated image frames as the external illumination becomes brighter, and it may configure a relatively large number of the designated image frames as the external illumination becomes darker. For example, if the external illumination is lowered below a designated value, the processor 340 may generate the first corrected image by combining the plurality of first image frames 401 in all.

At operation 1030, the processor 340 according to another embodiment may generate depth map 403 based on a reference image frame used during generation of the first corrected image. For example, if the first image frame 401 acquired in the x-th frame period during generation of the first corrected image is determined as the reference image frame, the processor 340 may generate the depth map 403 based on the first image frames 401 and the second image frames 402 acquired in the x-th frame period.

At operation 1040, the processor 340 according to another embodiment may generate a second corrected image by partially applying the blur effect to the first corrected image based on the depth map 403. For example, the processor 340 may generate the second corrected image in which at least parts of one or more external objects included in the first corrected image are blurred at least based on the depth information.

At operation 1050, the processor 340 according to another embodiment may control the display 330 to display the second corrected image.

Figure 12:
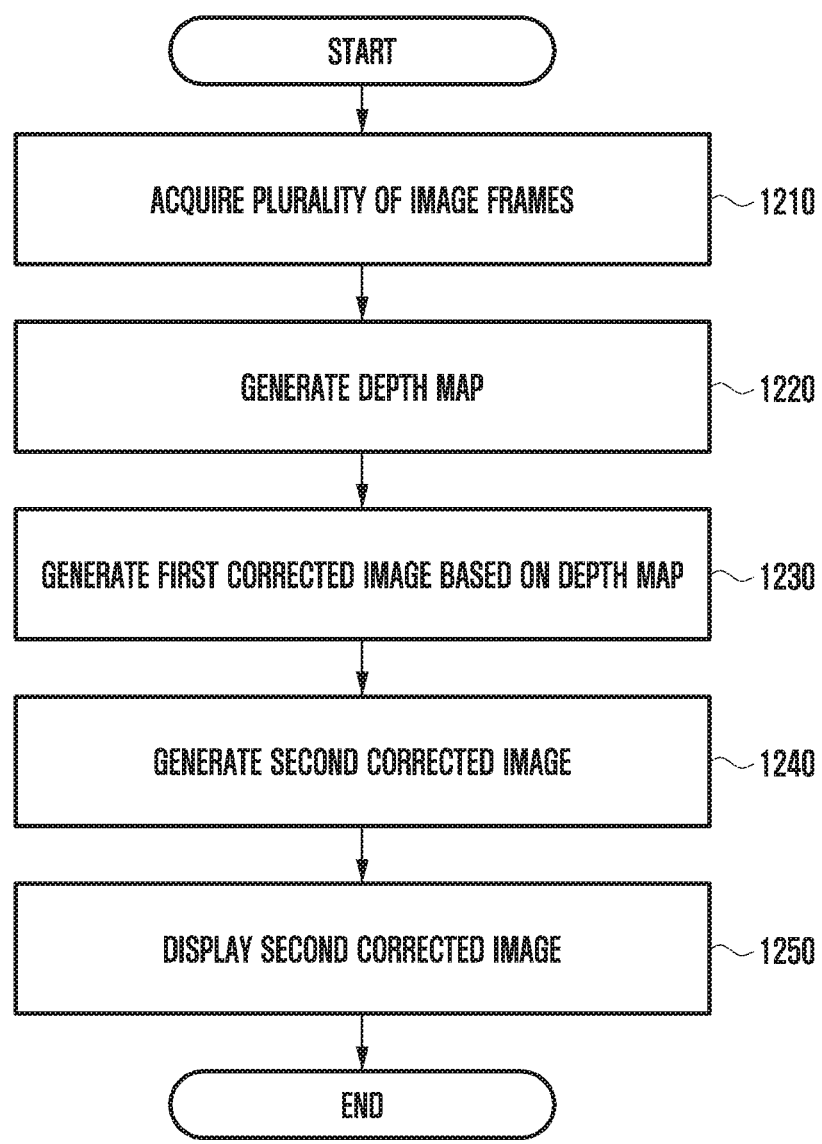
FIG. 12 is a flowchart illustrating a method for operating an electronic device according to another embodiment of the disclosure.

FIG. 12 is a flowchart illustrating a method for operating an electronic device according to another embodiment of the disclosure.

Figure 13:
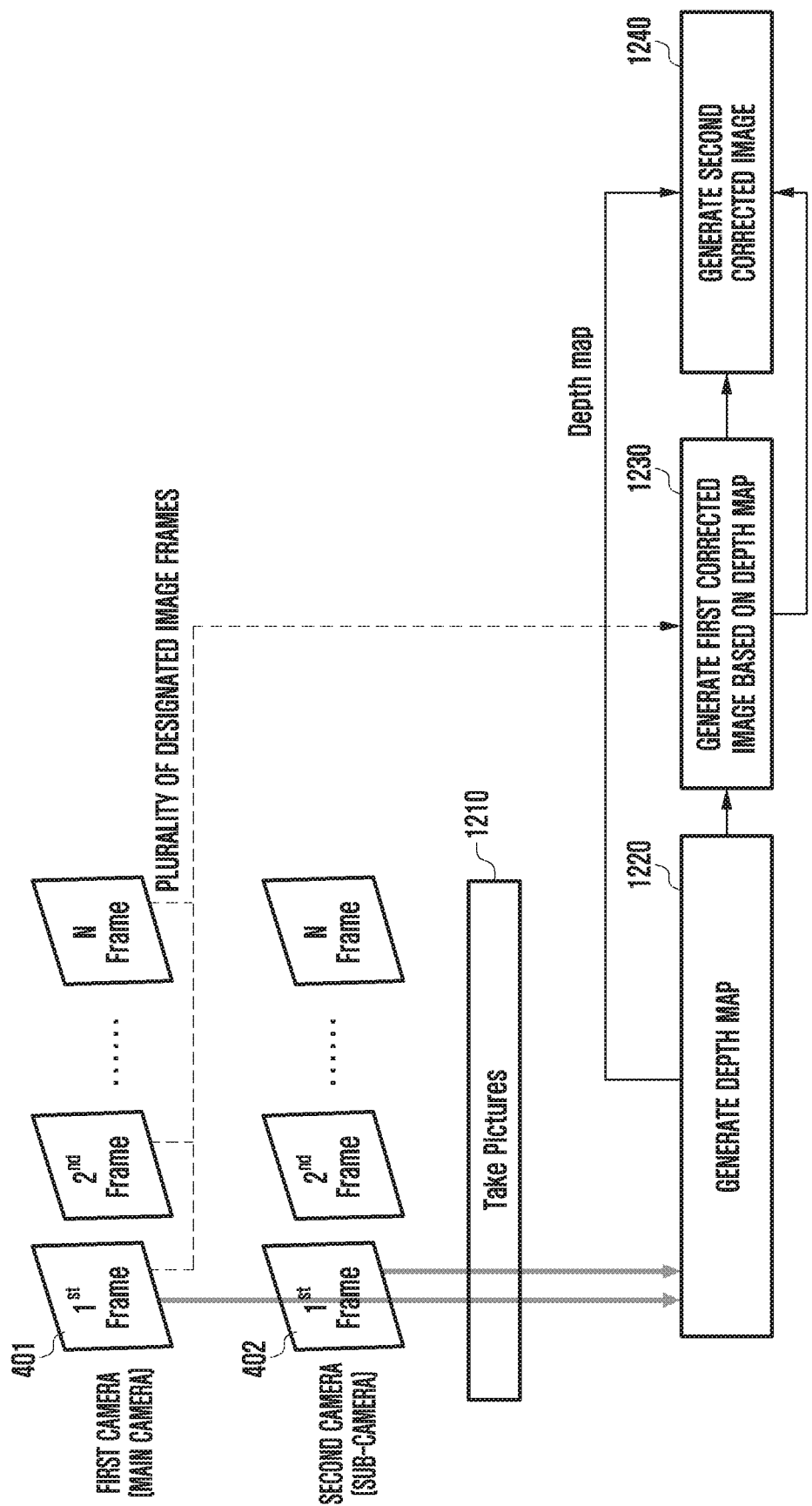
FIG. 13 is a diagram illustrating a method by an electronic device for generating a blur image in which a remaining portion excluding a specific portion is defocused using a plurality of cameras according to another embodiment of the disclosure.

FIG. 13 is a diagram illustrating a method by an electronic device for generating a blur image in which a remaining portion excluding a specific portion is defocused using a plurality of cameras according to another embodiment of the disclosure. Hereinafter, with reference to FIGS. 12 and 13, a method for operating an electronic device according to another embodiment of the disclosure will be described.

At operation 1210, a processor (e.g., processor 340 of FIG. 3) according to another embodiment may acquire a plurality of image frames using a first camera (e.g., first camera 310 of FIG. 3) (main camera) and a second camera (e.g., second camera 320 of FIG. 3) (sub-camera). For example, the processor 340 may acquire a plurality of first image frames 401 for one or more external objects through the first camera 310 based on a user input corresponding to a photographing signal, and it may acquire at least one second image frame 402 while acquiring at least parts of the plurality of first image frames 401.

At operation 1220, the processor 340 according to another embodiment may generate a depth map 403 based on the first image frames 401 and the second image frames 402 corresponding to the first image frame 401. For example, the first image frames 401 and the second image frames 402 may be image frames acquired in a first frame period among a plurality of frame periods in which the first image frames 401 are acquired.

At operation 1230, the processor 340 according to another embodiment may generate a first corrected image by combining a plurality of designated image frames among the plurality of first image frames 401 based on the depth map 403. For example, a first correction unit (e.g., first correction unit 343 of FIG. 3) of the processor 340 may further use the depth information in combining the designated image frames. For example, the first correction unit 343 may divide the reference image frame into a plurality of regions based on the depth information, and it may determine operating weights for the plurality of regions. According to an embodiment, based on the depth information, the first correction unit 343 may divide the reference image frame into a first region that is a focus region 511, a second region (e.g., foreground region 512) having a focal length that is shorter than the focal length of the first region, or a third region (e.g., background region 513) having a focal length that is longer than the focal length of the first region. According to an embodiment, the first correction unit 343 may differently determine the operating weights for the divided first to third regions, and it may configure a relatively high operating weight with respect to the first region that is the focus region 511. According to an embodiment, the first correction unit 343 may combine the designated image frames based on the determined operating weight. Because the electronic device 300 according to various embodiments of the disclosure generates the first corrected image using the depth information, it can use more memory resources or processing resources in improving the picture quality for the focus region 511, and thus it can generate a bokeh-effect image with an improved picture quality.

At operation 1240, the processor 340 according to another embodiment may generate a second corrected image by partially applying a blur effect to the first corrected image based on the depth map 403. For example, the processor 340 may generate the second corrected image in which at least parts of one or more external objects included in the first corrected image are blurred at least based on the depth information.

At operation 1250, the processor 340 according to another embodiment may control the display 330 to display the second corrected image.

Figure 14:
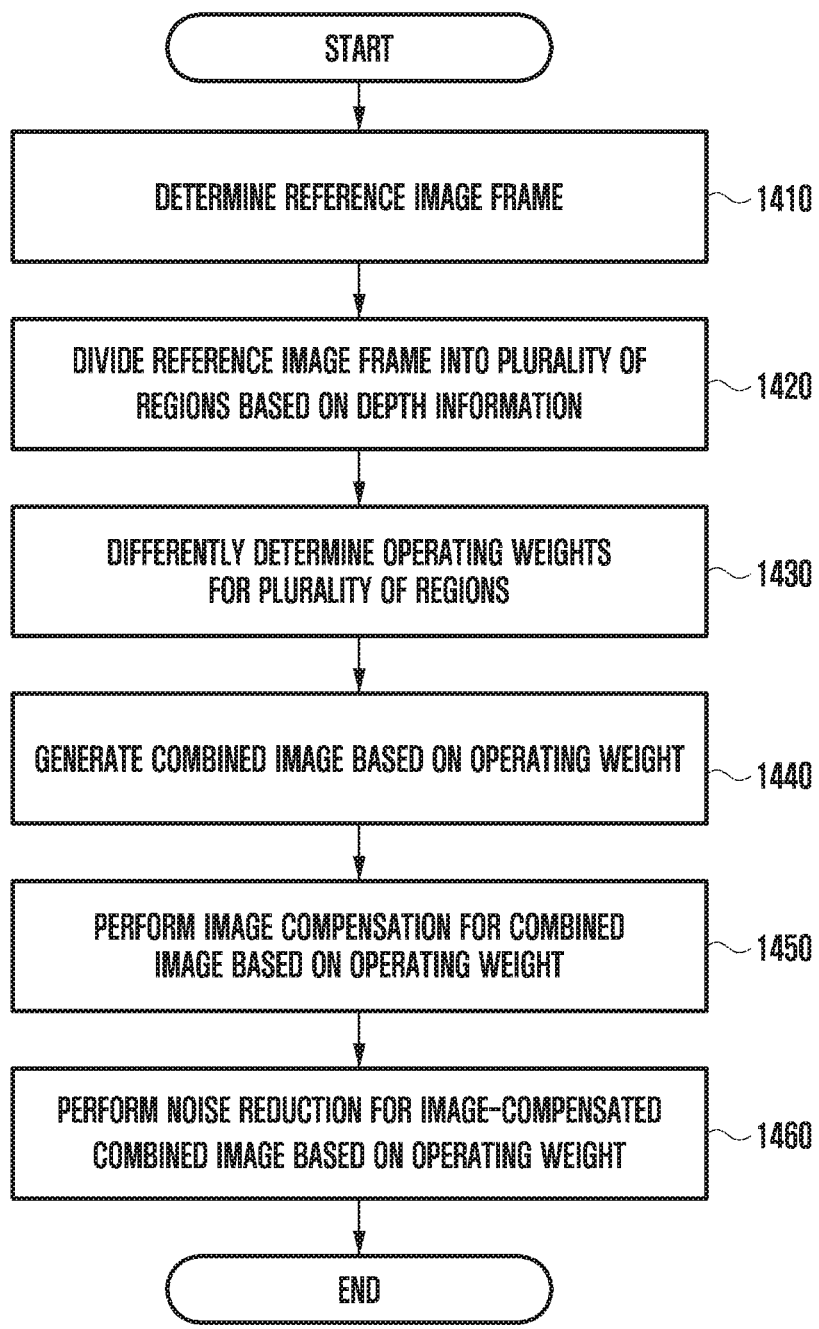
FIG. 14 is a flowchart illustrating a method by an electronic device for generating a first corrected image according to another embodiment of the disclosure.

FIG. 14 is a flowchart illustrating a method by an electronic device for generating a first corrected image according to another embodiment of the disclosure.

Figure 15:
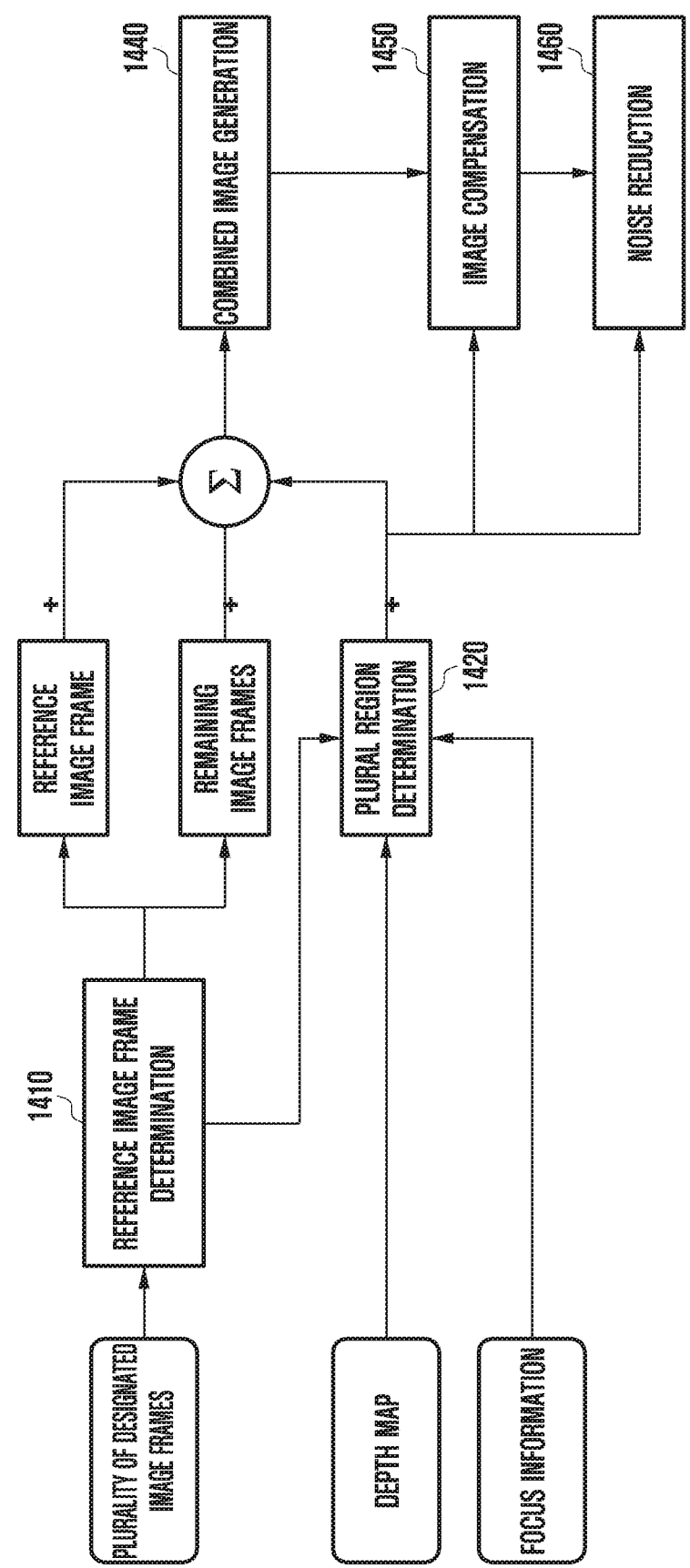
FIG. 15 is a diagram illustrating in detail a method by an electronic device for generating a first corrected image according to another embodiment of the disclosure.

FIG. 15 is a diagram illustrating in detail a method by an electronic device for generating a first corrected image according to another embodiment of the disclosure. For example, FIGS. 14 and 15 are diagrams explaining in detail operation 1230 illustrated in FIG. 12. Hereinafter, with reference to FIGS. 14 and 15, a method by an electronic device for generating a first corrected image according to another embodiment of the disclosure will be described.

At operation 1410, the processor 340 according to another embodiment may determine a plurality of designated image frames among a plurality of first image frames 401, and it may determine a reference image frame among the plurality of designated image frames. For example, the designated condition may include the blur degree of the first image frame or the handshake amount. As another example, the processor 340 may determine the image frame having the lowest blur degree and/or the smallest handshake amount among the plurality of first image frames 401 as the reference image frame. According to an embodiment, the processor 340 may determine the handshake amount based on the movement amount measured using an acceleration sensor during an exposure time of an image sensor.

At operation 1420, the processor 340 according to another embodiment may divide the reference image frame into a plurality of regions based on depth information. For example, based on the depth information, a first correction unit (e.g., first correction unit 343 of FIG. 3) of the processor 340 may divide the reference image frame into a first region that is a focus region 511, a second region (e.g., foreground region 512) having a focal length that is shorter than the focal length of the first region, or a third region (e.g., background region 513) having a focal length that is longer than the focal length of the first region.

At operation 1430, the processor 340 according to another embodiment may differently determine operating weights for the plurality of regions. For example, the processor 340 may differently determine the operating weights for the divided first to third regions, and it may configure a relatively high operating weight with respect to the first region that is the focus region 511.

At operation 1440, the processor 340 according to another embodiment may generate a combined image by combining the designated image frames that are at least parts of the plurality of first image frames 401 based on the reference image frame, and it may differently determine the combination amount for the plurality of regions based on the determined operating weight during the combining. For example, the processor 340 may combine more image frames with respect to a region that is relatively close to the focus region 511.

At operation 1450, the processor 340 according to another embodiment may perform image compensation with respect to the combined image based on the determined operating weight. For example, the processor 340 may perform a compensation algorithm to improve brightness, contrast, or sharpness with respect to the combined image, and it may differently determine the operating amount for performing the compensation algorithm for the plurality of regions. For example, the processor 340 may further perform the compensation algorithm to improve the brightness, contrast, or sharpness with respect to a region that is relatively close to the focus region 511.

At operation 1460, the processor 340 according to another embodiment may generate the first corrected image by performing noise reduction with respect to the image-compensated combined image based on the determined operating weight. For example, the processor 340 may further perform a noise reduction algorithm with respect to the region that is relatively close to the focus region 511.

Figure 16:
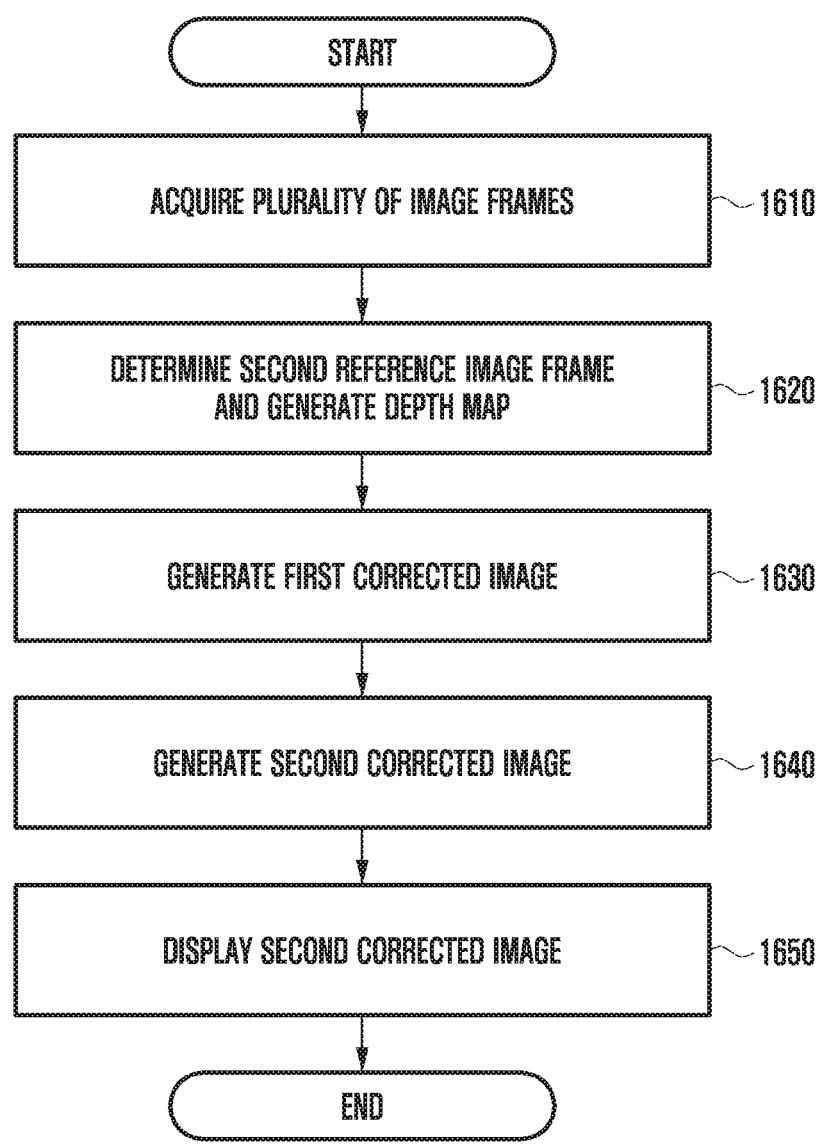
FIG. 16 is a flowchart illustrating a method for operating an electronic device according to another embodiment of the disclosure.

FIG. 16 is a diagram illustrating a method for operating an electronic device according to another embodiment of the disclosure.

Figure 17:
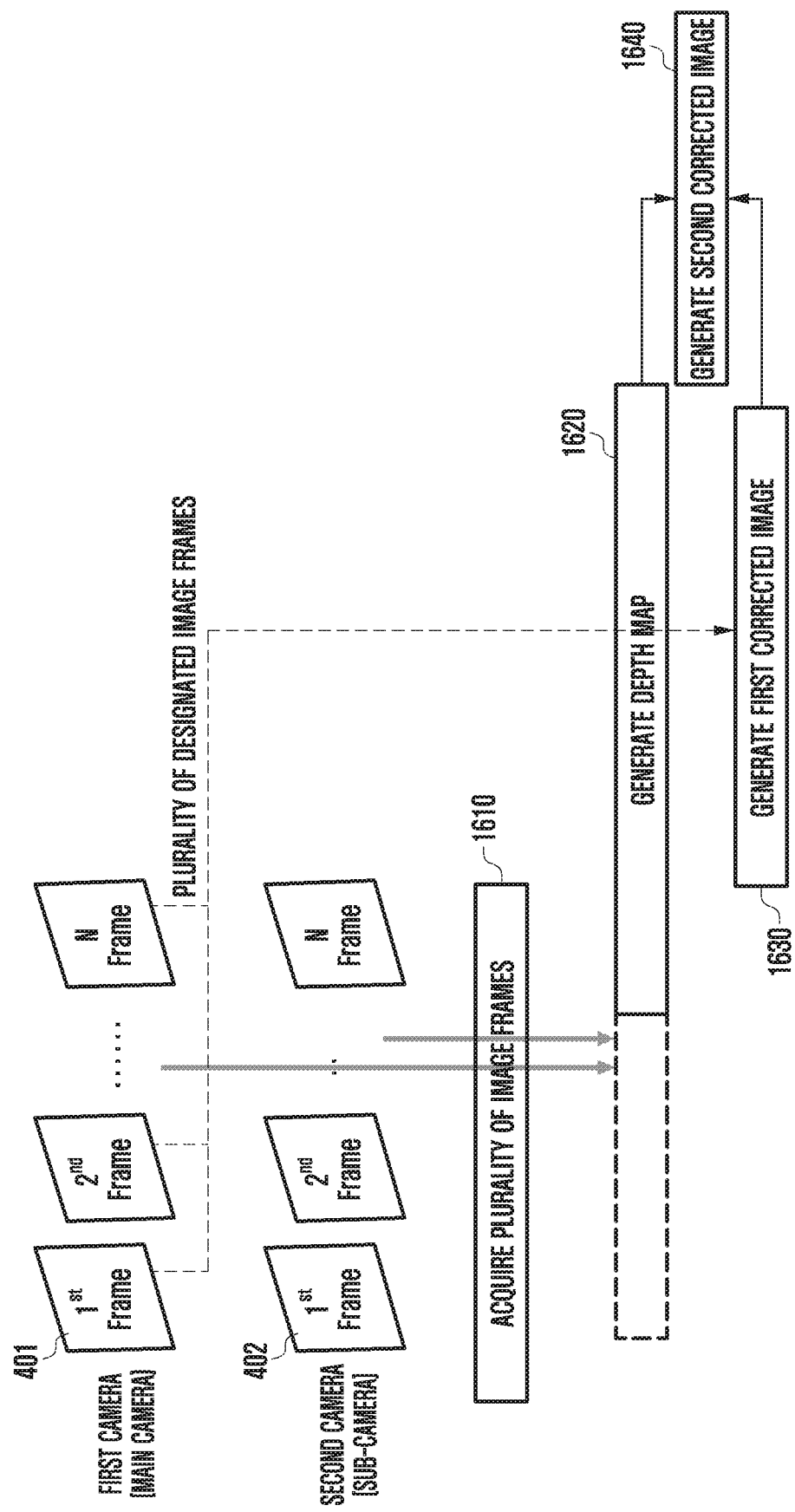
FIG. 17 is a diagram illustrating a method by an electronic device for generating a blur image in which a remaining portion excluding a specific portion is defocused using a plurality of cameras according to another embodiment of the disclosure.

FIG. 17 is a diagram illustrating a method by an electronic device for generating a blur image in which a remaining portion excluding a specific portion is defocused using a plurality of cameras according to another embodiment of the disclosure. Hereinafter, with reference to FIGS. 16 and 17, a method for operating an electronic device according to another embodiment of the disclosure will be described.

At operation 1610, a processor (e.g., processor 340 of FIG. 3) according to another embodiment may acquire a plurality of image frames using a first camera (e.g., first camera 310 of FIG. 3) (main camera) and a second camera (e.g., second camera 320 of FIG. 3) (sub-camera). For example, the processor 340 may acquire a plurality of first image frames 401 for one or more external objects through the first camera 310 based on a user input corresponding to a photographing signal, and it may acquire at least one second image frame 402 while acquiring at least parts of the plurality of first image frames 401.

At operation 1620, the processor 340 according to another embodiment may determine a second reference image frame among the plurality of first image frames 401 acquired during a plurality of designated frame periods among a plurality of frame periods for acquiring the first image frames 401. For example, the processor 340 may determine the image frame having the lowest blur degree and/or the smallest handshake amount among the plurality of first image frames 401 as the second reference image frame.

The processor 340 according to another embodiment may generate depth map based on the second reference image frame and an image frame corresponding to the second image frame 402 among the plurality of second image frames 402. For example, if the first image frame 401 acquired in the x-th frame period is determined as the second reference image frame, the processor 340 may generate the depth map 403 based on the first image frames 401 and the second image frames 402 acquired in the x-th frame period.

At operation 1630, the processor 340 according to another embodiment may generate a first corrected image by combining a plurality of designated image frames among the plurality of first image frames 401. For example, the processor 340 may measure an external illumination using an illumination sensor, and it may determine the number of designated image frames used to combine the images based on the external illumination. According to an embodiment, the processor 340 may configure a relatively small number of the designated image frames as the external illumination becomes brighter, and it may configure a relatively large number of the designated image frames as the external illumination becomes darker. For example, if the external illumination is lowered below a designated value, the processor 340 may generate the first corrected image by combining the plurality of first image frames 401 in all. The operation 1630 may be equal to or similar to the operations 810 to 840 illustrated in FIG. 8.

At operation 1640, the processor 340 according to another embodiment may generate a second corrected image by partially applying a blur effect to the first corrected image based on the depth map 403. For example, the processor 340 may generate the second corrected image in which at least parts of one or more external objects included in the first corrected image are blurred at least based on the depth information.

At operation 1650, the processor 340 according to another embodiment may control the display 330 to display the second corrected image.

According to various embodiments, the electronic device 300 according to the disclosure may adaptively select the above-described methods of FIG. 6, 10, 12, or 16 based on surrounding environmental information in generating a bokeh-effect image using a plurality of cameras. For example, the electronic device 300 according to various embodiments may generate the bokeh-effect image by adaptively selecting the methods of FIG. 6, 10, 12, or 16 based on external illumination. For example, the electronic device 300 may generate the bokeh-effect image using the method illustrated in FIG. 2 in an illumination environment in which the illumination is darker than the first illumination, the electronic device 300 may generate the bokeh-effect image using the method illustrated in FIG. 3 in the second to third illumination environments in which the illumination is brighter than the first illumination, and/or the electronic device 300 may generate the bokeh-effect image using the method illustrated in FIG. 1 or 4 in an illumination environment in which the illumination is brighter than the third illumination.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
   a first camera deployed on one side of the electronic device;
   a second camera deployed on the one side;
   a memory; and
   at least one processor, wherein the at least one processor is configured to:
   acquire a plurality of first image frames for one or more external objects using the first camera based on an input corresponding to a photographing signal,
   acquire a second image frame for the one or more external objects using the second camera while acquiring at least parts of the first image frames,
   generate depth information for the one or more external objects based on the image frame corresponding to the second image frame among the plurality of first image frames and the second image frame,
   generate a first corrected image by combining a plurality of designated image frames among the plurality of first image frames based on the depth information, and
   generate a second corrected image in which at least parts of the one or more external objects included in the first corrected image are blurred at least based on the depth information.

2. The electronic device of claim 1, wherein the processor is further configured to:
   determine a reference image frame among the plurality of first image frames based on a designated condition as a part of an operation of generating the first corrected image,
   generate a combined image by combining the plurality of designated image frames among the plurality of first image frames based on the reference image frame,
   perform image compensation with respect to the combined image, and
   generate the first corrected image by applying noise reduction with respect to the image-compensated combined image.

3. The electronic device of claim 2, wherein the at least one processor is further configured to:
   divide the reference image frame into a plurality of regions based on the depth information as a part of an operation of generating the first corrected image,
   determine operating weights for the plurality of regions, and
   generate the first corrected image by combining the plurality of designated image frames among the plurality of first image frames based on the operating weights.

4. The electronic device of claim 1,
   wherein the first camera comprises a first lens group having a first focal length and a first view angle, and
   wherein the second camera comprises a second lens group having a second focal length that is shorter than the first focal length and a second view angle that is equal to or larger than the first view angle.

5. The electronic device of claim 2, wherein the at least one processor is further configured to:
   acquire a plurality of second image frames corresponding to the plurality of first image frames as a part of an operation of acquiring the second image frame, and
   generate the depth information based on the reference image frame and the image frame corresponding to the reference image frame among the plurality of second image frames as a part of an operation of generating the depth information.

6. The electronic device of claim 4, wherein the at least one processor is further configured to generate the depth information based on the first image frame acquired in a first frame period among a plurality of frame periods for acquiring the first image frames and the second image frame as a part of an operation of generating the depth information.

7. The electronic device of claim 4, wherein the at least one processor is further configured to:
   determine a second reference image frame among the plurality of first image frames acquired in a plurality of designated frame periods among a plurality of frame periods for acquiring the first image frames as a part of an operation of generating the depth information, and
   generate the depth information based on the second reference image frame and the image frame corresponding to the second reference image frame among the plurality of first image frames.

8. A method for driving an electronic device, the method comprising:
   acquiring a plurality of first image frames for one or more external objects using a first camera based on an input corresponding to a photographing signal;
   acquiring a second image frame for the one or more external objects using a second camera while acquiring at least parts of the first image frames;
   generating depth information for the one or more external objects based on the image frame corresponding to the second image frame among the plurality of first image frames and the second image frame;
   generating a first corrected image by combining a plurality of designated image frames among the plurality of first image frames based on the depth information; and
   generating a second corrected image in which at least parts of the one or more external objects included in the first corrected image are blurred at least based on the depth information.

9. The method of claim 8, wherein the generating of the first corrected image comprises:
   determining a reference image frame among the plurality of first image frames based on a designated condition,
   generating a combined image by combining the plurality of designated image frames among the plurality of first image frames based on the reference image frame, performing image compensation with respect to the combined image, and generating the first corrected image by applying noise reduction with respect to the combined image to which the image compensation has been applied.

10. The method of claim 9, wherein the generating of the first corrected image further comprises:

dividing the reference image frame into a plurality of regions based on the depth information, determining operating weights for the plurality of regions, and generating the first corrected image by combining the plurality of designated image frames among the plurality of first image frames based on the operating weights.

11. The method of claim 9, wherein the acquiring of the second image frame comprises acquiring a plurality of second image frames corresponding to the plurality of first image frames.

12. The method of claim 11, wherein the generating of the depth information comprises generating the depth information based on the reference image frame and the image frame corresponding to the reference image frame among the plurality of second image frames.

13. The method of claim 11, wherein the generating of the depth information comprises generating the depth information based on the first image frame acquired in a first frame period among a plurality of frame periods for acquiring the first image frames and the second image frame.

14. The method of claim 11, wherein the generating of the depth information comprises:

determining a second reference image frame among the plurality of first image frames acquired in a plurality of designated frame periods among a plurality of frame periods for acquiring the first image frames, and generating the depth information based on the second reference image frame and the image frame corresponding to the second reference image frame among the plurality of second image frames.

* * * * *